(12) United States Patent
Adiga Manoor et al.

(10) Patent No.: US 12,255,549 B1
(45) Date of Patent: *Mar. 18, 2025

(54) HIGH CURRENT VOLTAGE-SOURCE CONVERTER

(71) Applicant: Smart Wires Inc., Union City, CA (US)

(72) Inventors: Shreesha Adiga Manoor, Milpitas, CA (US); Govind Chavan, Union City, CA (US); Mahsa Ghapandar Kashani, Millbrae, CA (US); Antonio Ginart, Santa Clarita, CA (US)

(73) Assignee: Smart Wires Inc., Durham, NC (US)

(*) Notice: Subject to any disclaimer, the term of this patent is extended or adjusted under 35 U.S.C. 154(b) by 544 days.

This patent is subject to a terminal disclaimer.

(21) Appl. No.: 17/352,035

(22) Filed: Jun. 18, 2021

Related U.S. Application Data

(60) Provisional application No. 63/198,480, filed on Oct. 21, 2020.

(51) Int. Cl.
*H02M 7/5387* (2007.01)
*H02M 7/483* (2007.01)

(52) U.S. Cl.
CPC ....... *H02M 7/53871* (2013.01); *H02M 7/483* (2013.01)

(58) Field of Classification Search
CPC .......................... H02M 7/53871; H02M 7/483
See application file for complete search history.

(56) References Cited

U.S. PATENT DOCUMENTS

| | | | | |
|---|---|---|---|---|
| 3,325,587 A | * | 6/1967 | Sontheimer | H01R 4/00 174/72 R |
| 3,646,400 A | * | 2/1972 | Demarest | H01L 25/03 361/689 |
| 3,648,147 A | * | 3/1972 | Leete | H02M 7/7575 363/35 |
| 4,153,880 A | * | 5/1979 | Navratil | H03B 27/00 365/6 |
| 4,837,671 A | * | 6/1989 | Wild | H02J 3/36 363/51 |
| 5,287,288 A | * | 2/1994 | Brennen | H02J 3/01 363/54 |
| 5,315,497 A | * | 5/1994 | Severinsky | H02M 5/4585 363/39 |
| 5,642,275 A | * | 6/1997 | Peng | H02M 7/4835 363/58 |
| 6,339,263 B1 | * | 1/2002 | Lejonberg | B60M 3/00 307/82 |
| 8,422,257 B2 | * | 4/2013 | Asplund | H02M 7/49 363/43 |
| 8,638,576 B2 | * | 1/2014 | Hosini | H02M 1/32 363/56.02 |
| 8,755,206 B2 | | 6/2014 | Nee | |
| 8,860,380 B2 | * | 10/2014 | Hasler | H02J 3/18 320/167 |

(Continued)

*Primary Examiner* — Yusef A Ahmed
(74) *Attorney, Agent, or Firm* — Womble Bond Dickinson (US) LLP

(57) ABSTRACT

A voltage source converter may be coupled to a transmission line. The voltage source converter has two or more inverter valve units. Each inverter valve unit has a full H bridge of switching devices and a capacitor. Paralleling conductor pairs connect the inverter valve units in parallel, in a self-balancing circuit arrangement.

20 Claims, 12 Drawing Sheets

(56) References Cited

U.S. PATENT DOCUMENTS

| | | | |
|---|---|---|---|
| 9,318,944 B2* | 4/2016 | Royak | H02M 7/797 |
| 9,389,263 B2* | 7/2016 | Sartler | G01R 19/0084 |
| 9,496,799 B2* | 11/2016 | Goetz | H02M 7/483 |
| 9,502,960 B2* | 11/2016 | Weyh | H02M 7/4835 |
| 9,520,801 B1* | 12/2016 | She | H02J 3/36 |
| 9,780,658 B2 | 10/2017 | Eckel et al. | |
| 10,193,340 B2* | 1/2019 | Specht | H02B 1/565 |
| 10,263,506 B2 | 4/2019 | Brueckner et al. | |
| 10,560,014 B2* | 2/2020 | Chivite-Zabalza | H02J 7/345 |
| 11,428,750 B1* | 8/2022 | Ginart | G01R 31/42 |
| 11,444,548 B2* | 9/2022 | Du | H02M 1/0074 |
| 11,545,833 B2* | 1/2023 | Cai | H02J 7/0048 |
| 11,575,332 B1* | 2/2023 | Ginart | H02M 7/493 |
| 11,652,367 B2* | 5/2023 | Boys | B60L 53/126 |
| | | | 307/104 |
| 11,758,700 B1* | 9/2023 | Inam | H05K 7/14339 |
| | | | 361/699 |
| 2003/0184403 A1* | 10/2003 | Goyette | H03H 7/42 |
| | | | 333/25 |
| 2005/0083716 A1* | 4/2005 | Marquardt | H02M 7/4835 |
| | | | 363/132 |
| 2008/0144342 A1* | 6/2008 | Du | H02M 7/49 |
| | | | 363/71 |
| 2009/0244936 A1* | 10/2009 | Falk | H02M 7/487 |
| | | | 363/40 |
| 2011/0096580 A1* | 4/2011 | Asplund | H02J 3/36 |
| | | | 363/132 |
| 2011/0205768 A1* | 8/2011 | Svensson | H02M 7/4835 |
| | | | 363/49 |
| 2012/0063181 A1* | 3/2012 | Chimento | H02J 3/1857 |
| | | | 363/56.03 |
| 2012/0069612 A1* | 3/2012 | Hasler | H02J 3/1842 |
| | | | 363/71 |
| 2012/0086412 A1* | 4/2012 | Chimento | H02M 7/4835 |
| | | | 323/207 |
| 2012/0092906 A1* | 4/2012 | Hasler | H02J 3/1857 |
| | | | 363/39 |
| 2012/0155130 A1* | 6/2012 | Hosini | H02M 7/49 |
| | | | 363/64 |
| 2012/0243282 A1* | 9/2012 | Marquardt | H02M 7/4835 |
| | | | 363/132 |
| 2013/0026841 A1* | 1/2013 | Hosini | H02M 7/4835 |
| | | | 307/77 |
| 2013/0121045 A1* | 5/2013 | Murakami | H02M 1/4233 |
| | | | 363/67 |
| 2013/0279211 A1* | 10/2013 | Green | H02J 3/1814 |
| | | | 363/35 |
| 2014/0043873 A1* | 2/2014 | Blomberg | H02H 7/1255 |
| | | | 363/53 |
| 2014/0049230 A1* | 2/2014 | Weyh | H02M 7/49 |
| | | | 323/207 |
| 2014/0169053 A1* | 6/2014 | Ilic | H02J 3/40 |
| | | | 363/132 |
| 2014/0268888 A1* | 9/2014 | Lv | H02M 7/4835 |
| | | | 363/10 |
| 2015/0009594 A1* | 1/2015 | Okaeme | H02J 3/36 |
| | | | 361/42 |
| 2015/0043254 A1* | 2/2015 | Preckwinkel | H02M 7/5395 |
| | | | 363/41 |
| 2016/0077566 A1* | 3/2016 | Caubert | B60L 15/20 |
| | | | 713/340 |
| 2016/0248341 A1* | 8/2016 | Trainer | H02M 1/08 |
| 2016/0352239 A1* | 12/2016 | Trainer | H02M 5/458 |
| 2016/0365787 A1* | 12/2016 | Geske | H02M 1/32 |
| 2017/0077834 A1* | 3/2017 | Trainer | H02M 7/483 |
| 2017/0104424 A1* | 4/2017 | Shen | H02M 7/487 |
| 2017/0294853 A1* | 10/2017 | Flannery | H02M 7/483 |
| 2018/0109202 A1* | 4/2018 | Marquardt | H02M 7/483 |
| 2018/0175719 A1* | 6/2018 | Ying | H02M 7/483 |
| 2018/0175761 A1* | 6/2018 | Jha | H02P 9/007 |
| 2019/0011512 A1* | 1/2019 | Wang | H03K 17/102 |
| 2019/0052187 A1* | 2/2019 | Geske | H02M 1/32 |
| 2019/0103750 A1* | 4/2019 | Kristensen | H01M 10/441 |
| 2019/0363644 A1* | 11/2019 | Li | H02M 7/5387 |
| 2021/0184594 A1* | 6/2021 | Shen | H02M 7/4833 |
| 2021/0249947 A1* | 8/2021 | Geske | H02M 1/32 |
| 2021/0384816 A1* | 12/2021 | Xiao | H02M 7/4835 |
| 2022/0005633 A1* | 1/2022 | Cao | H03H 7/06 |
| 2022/0039298 A1* | 2/2022 | Inam | H02J 3/1842 |
| 2022/0052621 A1* | 2/2022 | Liu | H02M 7/5387 |
| 2022/0094260 A1* | 3/2022 | Deng | H02M 1/0095 |
| 2022/0278602 A1* | 9/2022 | Erickson | H02M 1/009 |
| 2023/0307918 A1* | 9/2023 | Ginart | H02M 3/33573 |
| 2024/0088801 A1* | 3/2024 | Fang | H02J 3/32 |

\* cited by examiner

HIGH CURRENT VOLTAGE-SOURCE CONVERTER

CROSS-REFERENCE TO RELATED APPLICATIONS

This application claims benefit of priority from U.S. Provisional Application No. 63/198,480 titled High Current Voltage-Source Converter and filed Oct. 21, 2020, which is hereby incorporated by reference.

TECHNICAL FIELD

The present disclosure relates to a high current Voltage-Source Converter (VSC) for high voltage alternating current (HVAC) power transmission.

BACKGROUND

Modern electric power grids are widely interconnected. The need for these interconnections, apart from delivery, is to pool power generation plants and load centers to minimize generation capacity and energy costs. Power transmission and interconnection requirements include accommodating a diversity of loads and power sources reliably and with lower cost. Further the advent of large-scale distributed systems such as photovoltaic (PV) panels, wind turbines, energy storage devices, and electric vehicles require high current transmission lines that operate in excess of one thousand amps current as well as functionality that changes in real time. These requirements create challenges for ensuring power safety, quality and reliability.

A smart grid differs from a traditional power grid such that they provide a system to interconnect different kinds of distributed power generation sources. Therein, increasing demands are being placed on the transmission network due to an increasing number of non-utility generators. It is also exceedingly difficult to acquire and deploy new rights-of-way. The increased demands on transmission, combined with a lack of long-term planning and a desire to provide open access to generating companies and customers create further issues such as reduced security and reduced quality of service.

A Flexible Alternating Current (AC) Transmission System (FACTS) provides control of one or more AC transmission parameters to enhance controllability and increase power transfer capability. FACTS improve transmission quality, efficiency, and reliability, as well as reduce power delivery costs of AC grids. They are widely accepted as an essential technology for implementing smart grids.

A single-phase, modular, Static Synchronous Series Compensator (SSSC) is an important component of FACTS. The SSSC injects a leading or lagging voltage into the AC transmission line, providing the functionality of a series capacitor or series reactor respectively, i.e. it pushes power away from or pulls more power towards the circuit on which it is installed. This capability is effective in highly meshed electric power grids where spare system capacity can be utilized to resolve overloads. Further, SSSC's can be installed on dedicated transmission towers within the transmission right-of-way or in banks inside or nearby existing substations. They are well-suited for mobile applications due to their compact and lightweight modularity and high MVAr output.

The SSSC comprises a voltage-source converter which operates in series with the AC transmission line. A VSC with gate-controlled switching elements acts as a direct current (DC) to AC converter which exchanges active and reactive power with the AC system; it is used to generate and inject an AC voltage in series with the transmission line, and if the voltage is in phase quadrature with the transmission line current, it supplies or consumes variable reactive power. A VSC includes a plurality of gate-controlled switching elements and uses a DC capacitor as a current source. The unidirectional voltage of the DC capacitor is converted to an injected AC voltage through control of the switching elements. Further, the injected AC voltage is controlled in magnitude as well as its phase relationship to the AC system voltage. When the injected AC voltage is in phase quadrature with reference to the AC transmission current, leading or lagging, the VSC is used to absorb or supply reactive power. Since the VSC generates an AC voltage from a DC voltage it also referred to as an inverter, even though it has the capability to transfer power in either direction.

There are two commonly used VSC configurations: a Half-Bridge (HB) configuration and a Full H-bridge (FHB) configuration. The Half-Bridge (HB) configuration comprises a DC capacitor (C) and two switching elements. The two switching elements are driven by complementary signals and the corresponding (AC) voltage may be either equal to the DC capacitor voltage or zero. Alternatively, the Full H-bridge (FHB) configuration comprises a DC capacitor (C) and four switching elements. The generated voltage varies with the switching states of the switching elements. Compared with the HBM, there is at least one more capacitor ON state for the FHB such that the generated voltage is equal to the negative capacitor voltage (C) when two of the switching elements are switched ON. Another difference between the HBM and the FHBM is the energization state; the capacitor (C) voltage is inserted at the generated voltage of the FHB configuration regardless of the current direction. The circuitry requires bidirectionality since the DC voltage does not reverse, however the switching elements do not require having a reverse voltage capability since the direct current flows in two directions.

The VSC includes an inverter valve unit comprising a plurality of switching elements arranged in an FHB configuration. Examples of switching elements include but are not limited to, gate-controlled power semiconductor devices, insulated gate bipolar transistors (IGBTs), metal-oxide semiconductor field effect transistors (MOSFETs) or other similar devices. In the case of IGBTs, a diode referred to as a freewheeling diode is placed anti-parallel with the IGBT and conducts current in the opposite direction. The switching elements are connectedly arranged in series where each of the switching elements maintains a portion of the voltage applied to the inverter. A controller provides signals to drive the switching elements.

IGBTs can be the preferred semiconductor devices for the inverter valve unit. Their transistor characteristics require low drive power and they provide fast current turn-off capability. Progress in device and packaging materials allow for an increase in the power ratings and heat dissipation while reducing on-state and switching losses.

Compared to a single inverter valve unit, two or more inverter valve units connected in parallel increase the current capacity allowing the VSC to operate at high transmission line currents exceeding 1,000 amperes. The output AC voltage is the same, however, the added parallel connected inverter valve unit allows added transmission line current to flow through the VSC. In an ideal VSC comprising two parallel connected inverter valve units, the plurality of series and parallel connected switching elements (IGBTs, for example) have perfectly matched device characteristics (e.g.

switching time), the control circuit drives each switching element at precisely identical times, the DC capacitance characteristics are identical and all device characteristics remain constant over time. In the ideal VSC with two parallel connected inverter valve units, the system performs as a balanced system—the currents for each of the two parallel inverter valve units are identical in magnitude and have conforming waveforms to the transmission line current.

Real-world applications are non-ideal, as device characteristics are not perfectly matched and components age unevenly. Hence the VSC's electrical characteristics invariably change over time. If the device characteristics of the parallel connected switching elements are not matched identically or the control circuitry drives the switching elements with differing time delays relative to the other switching elements or the DC capacitors are unequal—the VSC operates as an unbalanced system. In an unbalanced system the currents for each of the two parallel inverter valve units are not identical in magnitude and nor have perfectly conforming waveforms to the transmission line current.

Unbalanced systems produce undesirable side-effects such as unwanted AC harmonics and excessive currents which may exceed the transmission line current by an order of magnitude or greater. The time duration of the excessive current in the order of milliseconds may vary depending in the extent of the imbalance. Excessive currents require higher component ratings which entails higher costs. Furthermore, excessive currents and the associated excessive heat can lead to the destruction of the switching elements and may also damage the drive unit and other system components. Finally, it is costly to match components at the point of manufacture as well as impractical to maintain constant performance characteristics over the operational lifetime of the VSC system. These factors restrict the use of parallel connected inverter valve units. To avoid such restrictions an active control system can be implemented to balance the power flow in real-time. The active control system dynamically adjusts the timing of the switching elements, circuit impedances and capacitances using an external controller. However, the active control system introduces other complications including increased component costs and reliability concerns. Hence there is a need for a self-balancing circuit for equalizing the currents for the parallel inverter valve units to operate high transmission line currents and simultaneously lowering component costs and improving the reliability of the VSC.

SUMMARY

Embodiments of a voltage source converter and related method of operation are described herein.

One embodiment of a voltage source converter has two or more inverter valve units. Each of the inverter valve units has a full H bridge of switching devices and a capacitor. Two or more paralleling conductor pairs connect the two or more inverter valve units in parallel, in a self-balancing circuit arrangement.

One embodiment of a voltage source converter has a first inverter valve unit, a second inverter valve unit, a first paralleling conductor pair and a second paralleling conductor pair. The first inverter valve unit has a first full H bridge of first switching devices and a first capacitor. The second inverter valve unit has a second full H bridge of second switching devices and a second capacitor. The first paralleling conductor pair and the second paralleling conductor pair connect the first inverter valve unit and the second inverter valve unit in parallel in a self-balancing circuit arrangement that has terminals for coupling to a transmission line.

One embodiment is a method of operation of a voltage source converter. The method includes controlling switching devices of a full H bridge having a capacitor, of each of two or more inverter valve units. The inverter valve units are connected by corresponding paralleling conductor pairs in a self-balancing circuit arrangement. The method includes producing balanced AC (alternating current) currents in each of the inverter valve units, as a result of the self-balancing circuit arrangement and controlling the switching devices.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
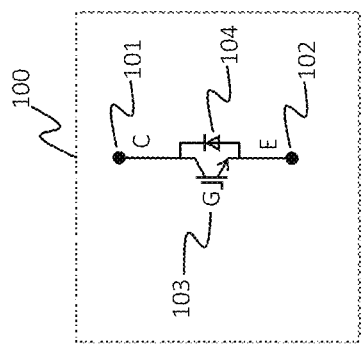
FIG. 1 illustrates an example IGBT switching element.

A high current Voltage-Source Converter (VSC) comprising a plurality of parallel connected inverter valve units is described herein in various embodiments. The inverter valve unit has switching elements arranged in a full H-bridge (FHB) configuration. Also described herein are a self-balancing circuit and method for equalizing the voltage-source converter currents.

The present disclosure provides a voltage-source converter that has inverter valve units connectedly arranged in parallel. The parallel connection combines the inverter valve AC currents such that the transmission line current equals the sum of the parallel connected inverter valve AC currents.

Compared to a single inverter valve unit, two or more inverter valve units connected in parallel serve to increase the transmission line current. A self-balancing circuit that has multiple paralleling conductor pairs provides parallel connection of the inverter valve units.

The present disclosure provides a series voltage-source converter (VSC) to operate high transmission line currents, for example exceeding 1,000 A. The self-balancing circuit arrangement for the parallel connected inverter valve units balances the current flows in the VSC thereby reducing unwanted signal distortions and high instantaneous currents within the VSC. Further, the use of a self-balancing balancing circuit arrangement reduces the system cost and increases the reliability of the VSC.

In accordance with the present disclosure, the inverter valve unit includes switching elements, i.e., insulated gate bipolar transistors (IGBTs) arranged in two groups in an FHB configuration. A first group of switching elements is connected in parallel with the second group of switching elements. The conducting wires of the first group of switching elements Q1 and Q4 are arranged to pass a current in a first direction (C charging). The conducting wires of the second group of switching elements Q2 and Q3 are arranged to pass a current in a second direction (C charging), the second direction is opposite of the first direction. When the switching elements of the two groups of the parallel inverter valve units are in functional operation, the currents theoretically equal and the sum of the two groups equals the line current.

The switching elements of the first and second group are connected in series. Each switch element includes a first connection (e.g., collector), a second connection (e.g., emitter) and a control connection (e.g., gate). The second connection (emitter) of switch element Q1 is connected to the first connection (collector) of switch element Q2. Similarly, the second connection (emitter) of switch element Q3 is connected to the first connection (collector) of switch element Q4. In the case of IGBTs, a freewheeling diode is inserted in parallel with the IGBTs.

The inverter valve unit includes a first terminal (T1) and a second terminal (T2) located on the DC side of the power inverter. A capacitor (C) is connected across the first terminal and a second terminal. The first terminal is connected to the positive side of the capacitor (C), the second terminal is connected to the negative side of the capacitor (C). A third terminal (T3) is connected to the first group and second groups of switching elements, to the second connection (emitter) of switch element Q3, also connected to the first connection (collector) of switch element Q4. A fourth terminal (T4) is connected the first group and second groups of switching elements, to the second connection (emitter) of switch element Q1, also connected to the first connection (collector) of switch element Q2.

In a first aspect, a voltage-source converter (VSC) has a first inverter valve unit and a second inverter valve unit connectedly arranged in parallel. The inverter valve unit includes a plurality of switching elements, i.e., insulated gate bipolar transistors (IGBTs) arranged in two groups in an FHB configuration. The switching elements of the first inverter valve unit and the second inverter valve unit function by turning on and turning off by the gate control signal for each switching element. A control drive circuit provides a gate drive signal for each switching element.

When all the switching elements are in function the first inverter valve unit produces a first AC current and the second inverter valve produces a second AC current. The parallel connection of the first inverter valve unit and second inverter valve unit combine the first AC current and the second AC current such that the transmission line current equals the sum of the first AC current and the second AC current. The unidirectional voltage of the DC capacitor is converted to an injected AC voltage-through sequential control of the switching elements. By way of control of the switching elements, it is possible to vary the injected AC voltage-in magnitude as well as the phase relationship to the AC system voltage. Therein the voltage-source converter injects an AC voltage in series with the line, and if the voltage is in phase quadrature with the line current, the series VSC supplies or consumes variable reactive power.

A dynamic self-balancing circuit arrangement comprising a first paralleling conductor pair provides parallel connection of the first inverter valve unit and the second inverter valve unit. In one embodiment, the paralleling conductor pair comprises two low impedance paralleling conductors, wherein the impedance of the low impedance paralleling conductor is less than 10 ohms. The first paralleling conductor pair connects the first terminal and the second terminal of the first inverter valve unit to the respective first terminal and the respective second terminal of the second inverter valve unit.

When all the switching elements are in function the first inverter valve unit produces a first AC current and the second inverter valve unit produces a second AC current such that the transmission line current equals the sum of the parallel connected first AC current and the second AC current. Therein, the circuit arrangement increases the AC current capacity of the power inverter. If the capacitors (C) are equal, the voltages and currents of the first inverter valve unit and the second inverter valve unit are equalized which lowers the circulating currents within the VSC and instantaneous voltages across each capacitor-providing a form of self-regulation or dynamic self-balancing.

Further, the dynamic self-balancing circuit arrangement embodied in a first paralleling conductor pair produces the first AC current of the first inverter valve unit equal to the second AC current of the second inverter valve unit such that the currents in the VSC are balanced. As a result, excessive currents within the VSC and unwanted AC harmonics on the transmission line current are reduced.

In a second aspect, a voltage-source converter (VSC) has a first inverter valve unit, a second inverter valve unit and a third inverter valve unit connectedly arranged in parallel. The inverter valve unit includes switching elements, e.g., insulated gate bipolar transistors (IGBTs), arranged in two groups in an FHB configuration. The switching elements of the first inverter valve unit, the second inverter valve unit and the third inverter valve unit function by turning on and turning off by the gate control signal for each switching element. A control drive circuit provides a gate drive signal for each switching element.

When all the switching elements are in functional operation, the first inverter valve unit produces a first AC current, the second inverter valve produces a second AC current and the third inverter valve unit produces a third AC current. The parallel connection of the first inverter valve unit, the second inverter valve unit and the third inverter valve unit combine the first AC current, the second AC current and the third AC current such that the transmission line current equals the sum of the first AC current and the second AC current and the third AC current. The unidirectional voltage of the DC capacitor is converted to an injected AC voltage-through sequential control of the switching elements. By way of control of the switching elements, it is possible to vary the injected AC voltage-in magnitude as well as the phase relationship to the AC system voltage. Therein the voltage-source converter injects an AC voltage in series with the line, and if the voltage is in phase quadrature with the line current, the VSC supplies or consumes variable reactive power.

A dynamic self-balancing circuit arrangement of paralleling conductor pairs provides parallel connection of the first inverter valve unit, the second inverter valve unit and the third inverter valve unit. In one embodiment, the paralleling conductor pair has two low impedance paralleling conductors, and the impedance of the low impedance paralleling conductor is less than 10 ohms. A first paralleling conductor pair connects the first terminal and the second terminal of the first inverter valve unit to the respective first terminal and the respective second terminal of the second inverter valve unit. A second paralleling conductor pair connects the first terminal and the second terminal of the second inverter valve unit to the respective first terminal and the respective second terminal of the third inverter valve unit. A third paralleling conductor pair connects the first terminal and the second terminal of the third inverter valve unit to the respective first terminal and the respective second terminal of the first inverter valve unit.

When all the switching elements are in functional operation, the first inverter valve unit produces the first AC current, the second inverter valve unit produces the second AC current and the third inverter valve unit produces the third AC current such that the transmission line current equals the sum of the parallel connected first AC current, the second AC current and the third AC current. Therein, the circuit arrangement increases the AC current capacity of the power inverter. If the capacitors are equal, voltages and currents of the first inverter valve unit, the second inverter valve unit and the third AC current are equalized which in turn lowers the circulating currents within the VSC and instantaneous voltages across each capacitor providing a form of self-regulation or dynamic self-balancing.

Further, the dynamic self-balancing circuit arrangement of the first paralleling conductor pair, the second paralleling conductor pair and the third paralleling conductor pair produces the first AC current of the first inverter valve unit equal to the second AC current of the second inverter valve unit and equal to the third AC current of the third inverter valve unit such that the currents in the VSC are balanced. As a result, excessive currents within the VSC and unwanted AC harmonics on the transmission line current are reduced.

In a third aspect, a voltage-source converter (VSC) has a first inverter valve unit, a second inverter valve unit, a third inverter valve unit and a fourth inverter valve unit connectedly arranged in parallel. The inverter valve unit includes multiple switching elements, e.g., insulated gate bipolar transistors (IGBTs), arranged in two groups in an FHB configuration. The switching elements of the first inverter valve unit, the second inverter valve unit, the third inverter valve unit and fourth inverter valve unit function by turning on and turning off by the gate control signal for each switching element. A control drive circuit provides a gate drive signal for each switching element.

When all the switching elements are in functional operation, the first inverter valve unit produces a first AC current, the second inverter valve produces a second AC current, the third inverter valve unit produces a third AC current and the fourth inverter valve unit produces a fourth AC current. The parallel connection of the first inverter valve unit, the second inverter valve unit, the third inverter valve unit and the fourth inverter valve unit combine the first AC current, the second AC current, the third AC current and the fourth AC current such that the transmission line current equals the sum of the first AC current, the second AC current, the third AC current and the fourth AC current. The unidirectional voltage of the DC capacitor is converted to an injected AC voltage-through sequential control of the switching elements. By way of control of the switching elements, it is possible to vary the injected AC voltage-in magnitude as well as the phase relationship to the AC system voltage. Therein the voltage-source converter injects an AC voltage in series with the line, and if the voltage is in phase quadrature with the line current, the series VSC supplies or consumes variable reactive power.

A dynamic self-balancing circuit arrangement that has paralleling conductor pairs provides parallel connection of the first inverter valve unit, the second inverter valve unit, the third inverter valve unit and the fourth inverter valve unit. In one embodiment, the paralleling conductor pair has two low impedance paralleling conductors, and the impedance of the low impedance paralleling conductor is less than 10 ohms. A first paralleling conductor pair connects the first terminal and the second terminal of the first inverter valve unit to the respective first terminal and the respective second terminal of the second inverter valve unit. A second paralleling conductor pair connects the first terminal and the second terminal of the second inverter valve unit to the respective first terminal and the respective second terminal of the third inverter valve unit. A third paralleling conductor pair connects the first terminal and the second terminal of the third inverter valve unit to the respective first terminal and the respective second terminal of the fourth inverter valve unit. A fourth paralleling conductor pair connects the first terminal and the second terminal of the fourth inverter valve unit to the respective first terminal and the respective second terminal of the first inverter valve unit.

When all the switching elements are in functional operation, the first inverter valve unit produces the first AC current, the second inverter valve unit produces the second AC current, the third inverter valve unit produces the third AC current and the fourth inverter valve unit produces the fourth AC current such that the transmission line current equals the sum of the parallel connected first AC current, second AC current, third AC current and fourth AC current. Therein, the circuit arrangement increases the AC current capacity of the power inverter. If the capacitors are equal, voltages and currents of the first inverter valve unit, the second inverter valve unit, the third inverter valve unit and the fourth inverter valve unit are equalized which in turn lowers the circulating currents within the VSC and instantaneous voltages across each capacitor providing a form of self-regulation or dynamic self-balancing.

Further, the dynamic self-balancing circuit arrangement of the first paralleling conductors pair, the second paralleling conductor pair, the third paralleling conductor pair and the fourth paralleling conductor pair produces the first AC current of the first inverter valve unit equal to the second AC current of the second inverter valve unit, equal to the third AC current of the third inverter valve unit and equal to the fourth AC current such that the currents in the VSC are balanced. As a result, excessive currents within the VSC and unwanted AC harmonics on the transmission line current are reduced.

In a fourth aspect, a voltage-source converter (VSC) has a first inverter valve unit, a second inverter valve unit, a third inverter valve unit, a fourth inverter valve unit and a fifth inverter valve unit connectedly arranged in parallel. The inverter valve unit includes a plurality of switching elements, e.g., insulated gate bipolar transistors (IGBTs), arranged in two groups in an FHB configuration. The switching elements of the first inverter valve unit, the second inverter valve unit, the third inverter valve unit, the fourth inverter valve unit and the fifth inverter valve unit function by turning on and turning off by the gate control signal for each switching element. A control drive circuit provides a gate drive signal for each switching element.

When all the switching elements are in functional operation, the first inverter valve unit produces a first AC current, the second inverter valve produces a second AC current, the third inverter valve unit produces a third AC current, the fourth inverter valve unit produces a fourth AC current and the fifth inverter valve unit produces a fifth AC current. The parallel connection of the first inverter valve unit, the second inverter valve unit, the third inverter valve unit, the fourth inverter valve unit and the fifth inverter valve unit combine the first AC current, the second AC current, the third AC current, the fourth AC current and the fifth AC current such that the transmission line current equals the sum of the first AC current, the second AC current, the third AC current, the fourth AC current and the fifth AC current. The unidirectional voltage of the DC capacitor is converted to an injected AC voltage-through sequential control of the switching elements. By way of control of the switching elements, it is possible to vary the injected AC voltage-in magnitude as well as the phase relationship to the AC system voltage. Therein the voltage-source converter injects an AC voltage in series with the line, and if the voltage is in phase quadrature with the line current, the series VSC supplies or consumes variable reactive power.

A dynamic self-balancing circuit arrangement of paralleling conductor pairs provides parallel connection of the first inverter valve unit, the second inverter valve unit, the third inverter valve unit, the fourth inverter valve unit and the fifth inverter valve unit. In one embodiment, the paralleling conductor pair has two low impedance paralleling conductors, and the impedance of the low impedance paralleling conductor is less than 10 ohms. A first paralleling conductor pair connects the first terminal and the second terminal of the first inverter valve unit to the respective first terminal and the respective second terminal of the second inverter valve unit. A second paralleling conductor pair connects the first terminal and the second terminal of the second inverter valve unit to the respective first terminal and the respective second terminal of the third inverter valve unit. A third paralleling conductor pair connects the first terminal and the second terminal of the third inverter valve unit to the respective first terminal and the respective second terminal of the fourth inverter valve unit. A fourth paralleling conductor pair connects the first terminal and the second terminal of the fourth inverter valve unit to the respective first terminal and the respective second terminal of the fifth inverter valve unit. A fifth paralleling conductor pair connects the first terminal and the second terminal of the fifth inverter valve unit to the respective first terminal and the respective second terminal of the first inverter valve unit.

When all the switching elements are in functional operation, the first inverter valve unit produces the first AC current, the second inverter valve unit produces the second AC current, the third inverter valve unit produces the third AC current, the fourth inverter valve unit produces the fourth AC current and the fifth inverter valve unit produces the fifth AC current such that the transmission line current equals the sum of the parallel connected first AC current, the second AC current, the third AC current, the fourth AC current and the fifth AC current. Therein, the circuit arrangement increases the AC current capacity of the power inverter. If the capacitors are equal, voltages and currents of the first inverter valve unit, the second inverter valve unit, the third inverter valve unit and the fourth inverter valve unit are equalized which in turn lowers the circulating currents within the VSC and instantaneous voltages across each capacitor providing a form of self-regulation or dynamic self-balancing.

Further, the dynamic self-balancing circuit arrangement of the first paralleling conductor pair, the second paralleling conductor pair, the third paralleling conductor pair, the fourth paralleling conductor pair and the fifth paralleling conductor pair produces the first AC current of the first inverter valve unit equal to the second AC current of the second inverter valve unit, equal to the third AC current of the third inverter valve unit, equal to the fourth AC current and equal to the fifth AC current such that the currents in the VSC are balanced. As a result, excessive currents within the VSC and unwanted AC harmonics on the transmission line current and are reduced.

In a fifth aspect, a voltage-source converter (VSC) has a first inverter valve unit, a second inverter valve unit, a third inverter valve unit, a fourth inverter valve unit, a fifth inverter valve unit and a sixth inverter valve connectedly arranged in parallel. The inverter valve unit includes switching elements, e.g., insulated gate bipolar transistors (IGBTs), arranged in two groups in an FHB configuration. The switching elements of the first inverter valve unit, the second inverter valve unit, the third inverter valve unit, the fourth inverter valve unit, the fifth inverter valve unit and the sixth inverter valve unit function by turning on and turning off by the gate control signal for each switching element. A control drive circuit provides a gate drive signal for each switching element.

When all the switching elements are in functional operation, the first inverter valve unit produces a first AC current, the second inverter valve produces a second AC current, the third inverter valve unit produces a third AC current, the fourth inverter valve unit produces a fourth AC current, the fifth inverter valve unit produces a fifth AC current and the sixth inverter valve unit produces a sixth AC current. The parallel connection of the first inverter valve unit, the second inverter valve unit, the third inverter valve unit, the fourth inverter valve unit, the fifth inverter valve unit and the sixth inverter valve unit combine the first AC current, the second AC current, the third AC current, the fourth AC current, the fifth AC current and the sixth AC current such that the transmission line current equals the sum of the first AC current, the second AC current, the third AC current, the fourth AC current, the fifth AC current and the sixth AC current. The unidirectional voltage of the DC capacitor is converted to an injected AC voltage through sequential control of the switching elements. By way of control of the switching elements, it is possible to vary the injected AC voltage-in magnitude as well as the phase relationship to the AC system voltage. Therein the voltage-source converter injects an AC voltage in series with the line, and if the voltage is in phase quadrature with the line current, the series VSC supplies or consumes variable reactive power.

A dynamic self-balancing circuit arrangement of paralleling conductor pairs provides parallel connection of the first inverter valve unit, the second inverter valve unit, the third inverter valve unit, the fourth inverter valve unit, the fifth inverter valve unit and the sixth inverter valve unit. In one embodiment, the paralleling conductor pair has two low impedance paralleling conductors, and the impedance of the low impedance paralleling conductor is less than 10 ohms. A first paralleling conductor pair connects the first terminal and the second terminal of the first inverter valve unit to the respective first terminal and the respective second terminal of the second inverter valve unit. A second paralleling conductor pair connects the first terminal and the second terminal of the second inverter valve unit to the respective first terminal and the respective second terminal of the third inverter valve unit. A third paralleling conductor pair connects the first terminal and the second terminal of the third inverter valve unit to the respective first terminal and the respective second terminal of the fourth inverter valve unit. A fourth paralleling conductor pair connects the first terminal and the second terminal of the fourth inverter valve unit to the respective first terminal and the respective second terminal of the fifth inverter valve unit. A fifth paralleling conductor pair connects the first terminal and the second terminal of the fifth inverter valve unit to the respective first terminal and the respective second terminal of the sixth inverter valve unit. A sixth paralleling conductor pair connects the first terminal and the second terminal of the sixth inverter valve unit to the respective first terminal and the respective second terminal of the first inverter valve unit.

When all the switching elements are in functional operation, the first inverter valve unit produces the first AC current, the second inverter valve unit produces the second AC current, the third inverter valve unit produces the third AC current, the fourth inverter valve unit produces the fourth AC current, the fifth inverter valve unit produces the fifth AC current and the sixth inverter valve unit produces the sixth AC current such that the transmission line current equals the sum of the parallel connected first AC current, the second AC current, the third AC current, the fourth AC current, the fifth AC current. and the sixth AC current. Therein, the circuit arrangement increases the AC current capacity of the power inverter. If the capacitors are equal, voltages and currents of the first inverter valve unit, the second inverter valve unit, the third inverter valve unit, the fourth inverter valve unit, the fifth inverter valve unit and the sixth inverter valve unit are equalized which in turn lowers the circulating currents within the VSC and instantaneous voltages across each capacitor providing a form of self-regulation or dynamic self-balancing.

Further, the dynamic self-balancing circuit arrangement of the first paralleling conductors pair, the second paralleling conductor pair, the third paralleling conductor pair, the fourth paralleling conductor pair and the fifth paralleling conductor pair and the sixth paralleling conductor pair produces the first AC current of the first inverter valve unit equal to the second AC current of the second inverter valve unit, equal to the third AC current of the third inverter valve unit, equal to the fourth AC current, equal to the fifth AC current and equal to the sixth AC current such that the currents in the VSC are balanced. As a result, excessive currents within the VSC and unwanted AC harmonics on the transmission line current and are reduced.

In a sixth aspect, the self-balancing circuit prevents excessive currents and the resulting damage to the switching elements and other system components since excessive currents can lead to the destruction and reduced reliability of the switching elements, capacitor break down and may also damage the drive circuit and other system components.

In a seventh aspect, the self-balancing circuit simplifies the control drive circuit and gate control signal for each switching element. Passive components and the associated circuitry are significantly less expensive to produce than an active control system functioning to balance the power flow in real time. As a result, the system cost is reduced, and the system reliability is increased since there are fewer components that can fail and/or damage to the power converter.

The above aspects and various embodiments of circuits are illustrated in the drawings as further described below.

FIG. 1 illustrates a block diagram of an example switching element according to one embodiment. Switching element 100 includes a first connection 101 (e.g., collector), a second connection 102 (e.g., emitter) and a control connection 103 (e.g., gate). In the case of IGBTs, a freewheeling diode 104 is inserted anti-parallel with the IGBT.

Figure 2:
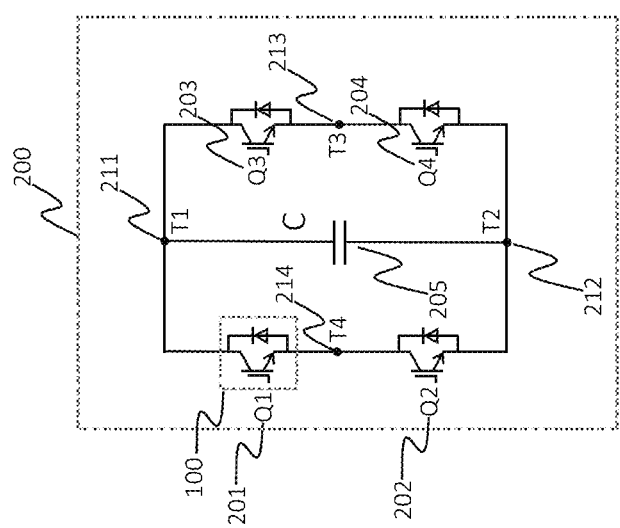
FIG. 2 illustrates an example inverter valve unit.

FIG. 2 illustrates a block diagram of an example inverter valve unit according to one embodiment. Inverter valve unit 200 includes a plurality of switching elements 100 arranged in a full H-bridge (FHB) configuration.

A FHB configuration comprises of a DC capacitor (C) 205 and four switching elements Q1 201, Q2 202, Q3 203 and Q4 204; the AC output voltage across T4 214 and T3 213 varies with the switching states of switching elements Q1 201, Q2 202, Q3 203 and Q4 204. IGBTs can be the semiconductor devices for the four switching elements. In the case of IGBTs, a freewheeling diode 104 is inserted anti-parallel with the IGBTs.

The IGBTs are arranged in two groups. A first group of switching elements, Q1 201 and Q4 204, is connected in parallel with the second group of switching elements, Q3 203 and Q2 202. Conducting wires of the first group of switching elements Q1 201 and Q4 204 are arranged to pass a current in a first direction (C charging). Conducting wires of the second group of switching elements Q2 202 and Q3 203 are arranged to pass a current in a second direction (C charging), the second direction is opposite of the first direction. When the switching elements of the two groups of the parallel inverter valve units are in functional operation, the currents equal and the sum of the two groups equal the transmission line current.

The switching elements 100 of the first and second group are connected in series. The second connection 102 (emitter) of switch element Q1 201 is connected to the first connection (collector) 101 of switch element Q2 202. Similarly, the second connection (emitter) 102 of switch element Q3 203 is connected to the first connection (collector) 101 of switch element Q4 204.

The inverter valve unit 200 includes a first terminal (T1) 211 and a second terminal (T2) 212. A capacitor (C) 205 is connected across the first terminal 211 and a second terminal 212. The first terminal is connected to the positive side of the capacitor (C) 205, the second terminal is connected to the negative side of the capacitor (C) 205. A third terminal (T3) 213 is connected to the first group and second groups of switching elements, to the second connection (emitter) of switch element Q3 204, also connected to the first connection (collector) of switch element Q4 204. A fourth terminal (T4) 214 is connected the first group and second groups of switching elements, to the second connection (emitter) of switch element Q1 201, also connected to the first connection (collector) of switch element Q2 202.

Figure 3:
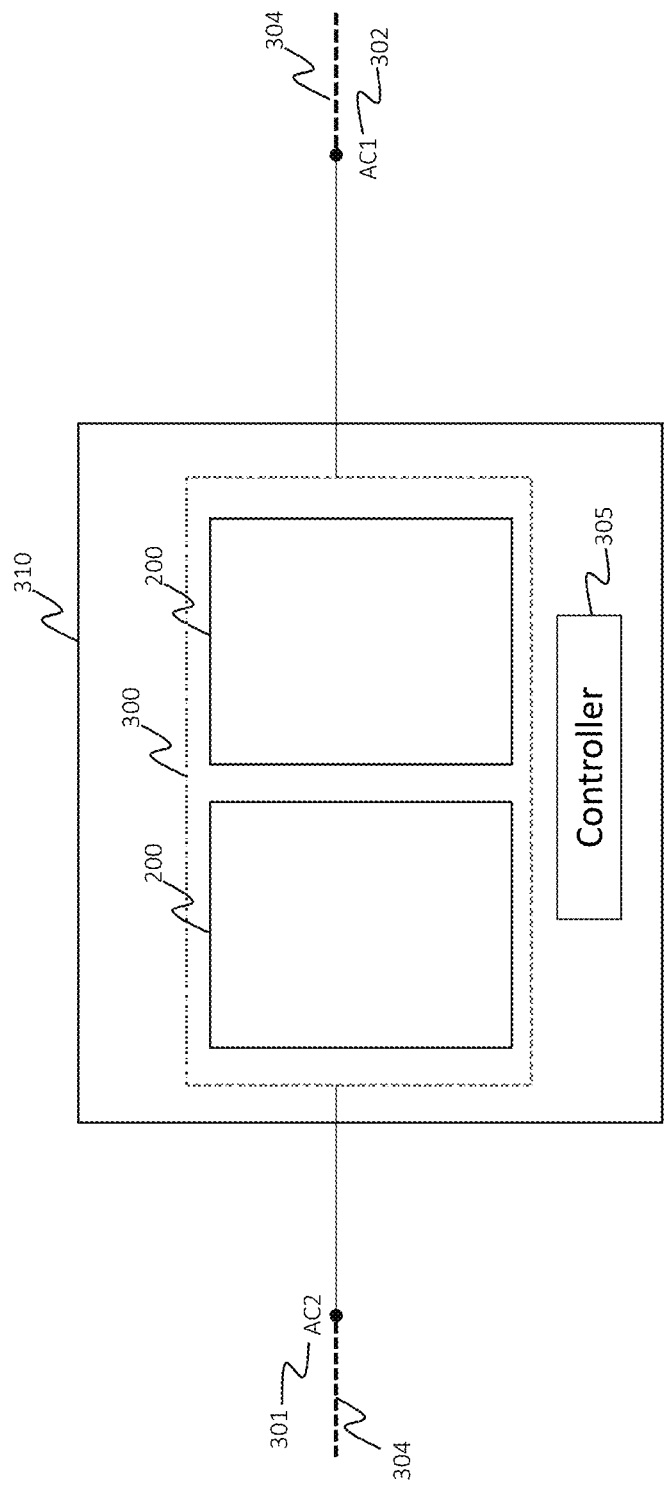
FIG. 3 illustrates a block diagram of an example static synchronous series compensator.

FIG. 3 illustrates a block diagram of an example SSSC according to one embodiment. SSSC 300 comprises a Voltage-Source Converters (VSC) 303 which operates in series with the transmission line 304. The VSC is series coupled to the transmission line via terminals AC1 301 and AC2 302. The transmission line current flows through terminals AC1 301 and AC2 302. The VSC comprises a plurality of inverter valve units 200. A controller 305 provides control signal circuitry to drive the switching elements 100.

Figure 4:
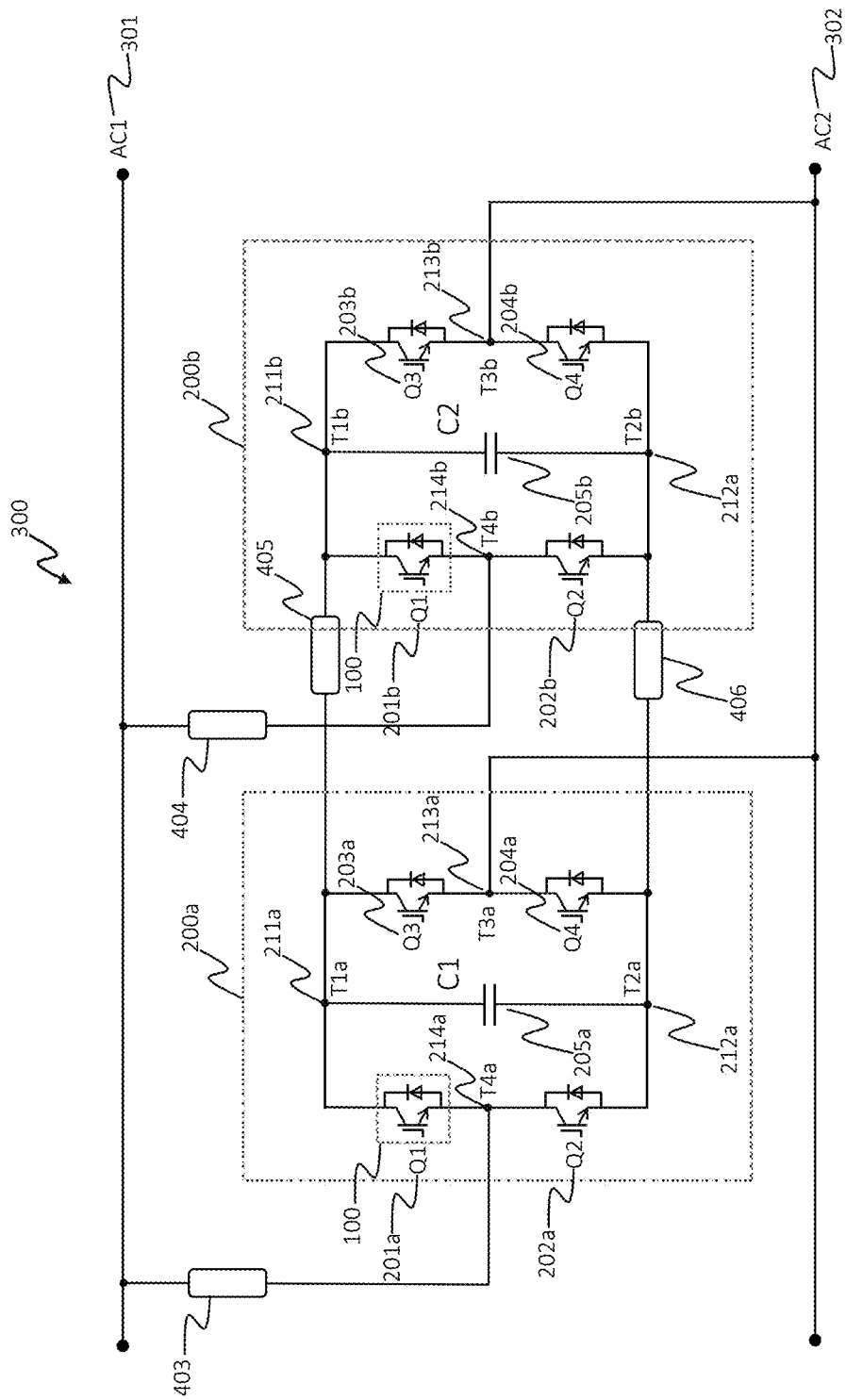
FIG. 4 illustrates a circuit diagram of an example voltage-source converter comprising two parallel inverter valve units.

A first embodiment of a VSC 400 is shown in FIG. 4. In the embodiment, a first inverter valve unit 200a and a second inverter valve unit 200*b* are connectedly arranged in parallel. The first inverter valve unit 200*a* produces a first AC current; the second inverter valve unit 200*b* produces a second AC current. The parallel connection of the first inverter valve unit 200*a* and second inverter valve unit 200*b* combine the first AC current and the second AC current such that the transmission line current flowing through terminals AC1 301 and AC2 302 equals the sum of the first AC current and the second AC current. The capacitors 205*a* and 205*b* have equal capacitance. IGBT's 201*a*, 201*b*, 202*a*, 202*b*, 203*a*, 203*b*, 204*a* and 204*b* are same specification components, for example, Mitsubishi Electric CM1000DX(P)-24T.

A plurality of paralleling conductors 405 and 406 provides parallel connection of the first inverter valve unit 200*a* and the second inverter valve unit 200*b*. The paralleling conductors 405 and 406 comprise low impedance paralleling conductors. The impedance of the low impedance paralleling conductor is less than 10 ohms. A first paralleling conductor 405 connects the first terminal T1*a* 211*a* of the first inverter valve unit 200*a* to the first terminal of the second inverter valve unit T1*b* 211*b*. Similarly, a second paralleling conductor 406 connects the second terminal T2*a* 212*a* of the first inverter valve unit to the second terminal T2*b* 212*b* of the second inverter valve unit. The switching elements of the first inverter valve unit 200*a*, namely switching elements 201*a*, 202*a*, 203*a* and 204*a* and the second inverter valve unit 200*b* switching elements 201*b*, 202*b*, 203*b* and 204*b* function by turning on and turning off by the gate control signal for each switching element 100.

A first differential mode choke (DMC) inductor 403 couples the first inverter valve unit 200*a* to the transmission line. The DMC inductor 403 is connected to the transmission line terminal AC1 301 and the first inverter valve unit fourth terminal T4*a* 214. The DMC inductor 404 is connected to the transmission line terminal AC1 301 and the second inverter valve unit fourth terminal T4*b* 214.

When all the switching elements are in functional operation, the first inverter valve unit 200*a* produces a first AC current that flows between terminal T4*a* 214*a* and T3*a* 213*a*, and the second inverter valve unit 200*b* produces a second AC current that flows between terminal terminals T4*b* 214*b* and T3*b* 213*b*, such that the current flowing between the transmission line via terminals AC1 303 and AC2 304 equals the sum of the parallel connected first AC current and second AC current. The unidirectional voltages of the DC capacitors C1 205*a* and C2 205*b* are converted and presented across terminals T4*a* 214*a* and T3*a* 213*a*, and T4*b* 214*b* and T3*b* 213*b* as the injected AC voltage through sequential control of the IGBT switching elements 201*a*, 202*a*, 203*a*, 204*a* 201*b*, 202*b*, 203*b* and 204*b*.

Figure 5:
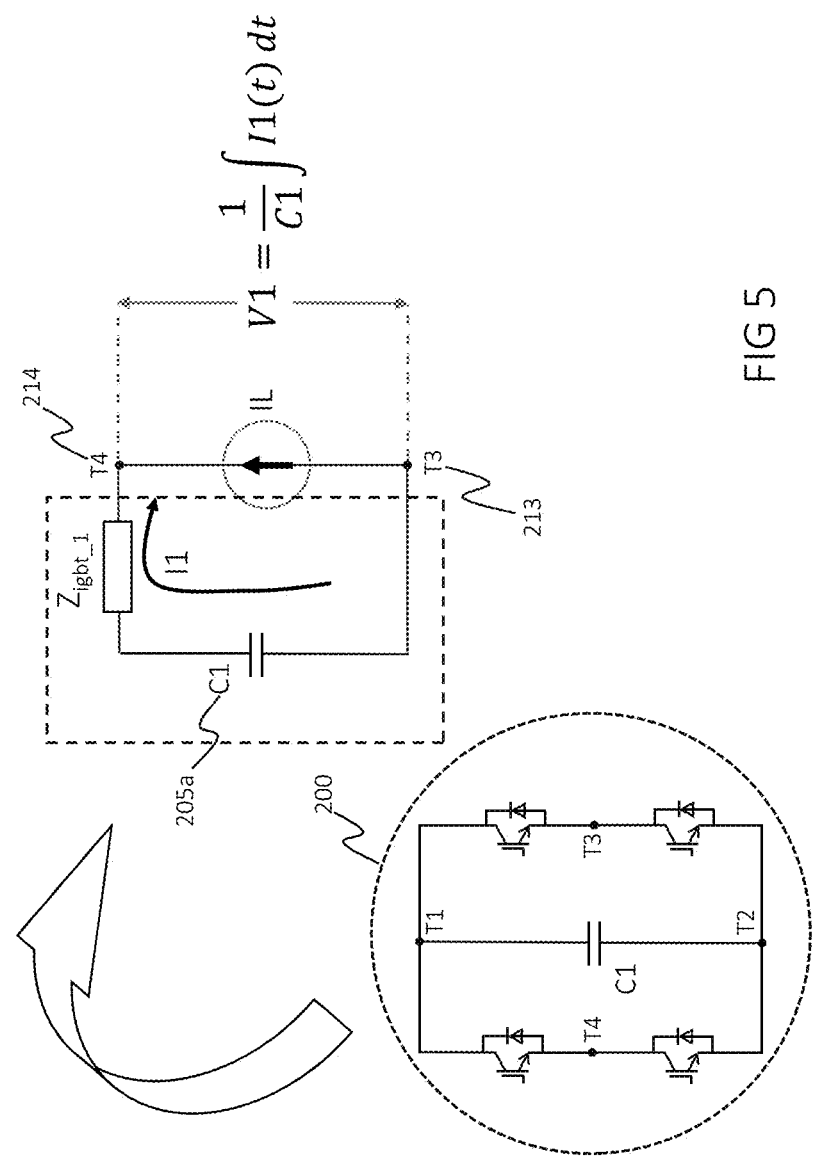
FIG. 5 illustrates an equivalent circuit of an inverter valve unit.

FIG. 5 illustrates an equivalent circuit of the inverter valve unit 200 and the following conditions are fulfilled:

$$Z_{C1} \gg Z_{Igbt\_1},$$

$$I_1(t) = I_L(t),$$

$$V1 = \frac{1}{C1}\int I1(t)dt$$

where;
$Z_{C1}$ cis the equivalent impedance of C1 205*a*,
$Z_{Igbt\_1}$ is the IGBTs, switching element 100, equivalent impedance,
$I_1(t)$ is the first AC current of the inverter valve unit 200,
$I_L$ (t) is the transmission line 304 current, and V1 is the injected AC voltage of the of the inverter valve unit 200.

Figure 6:
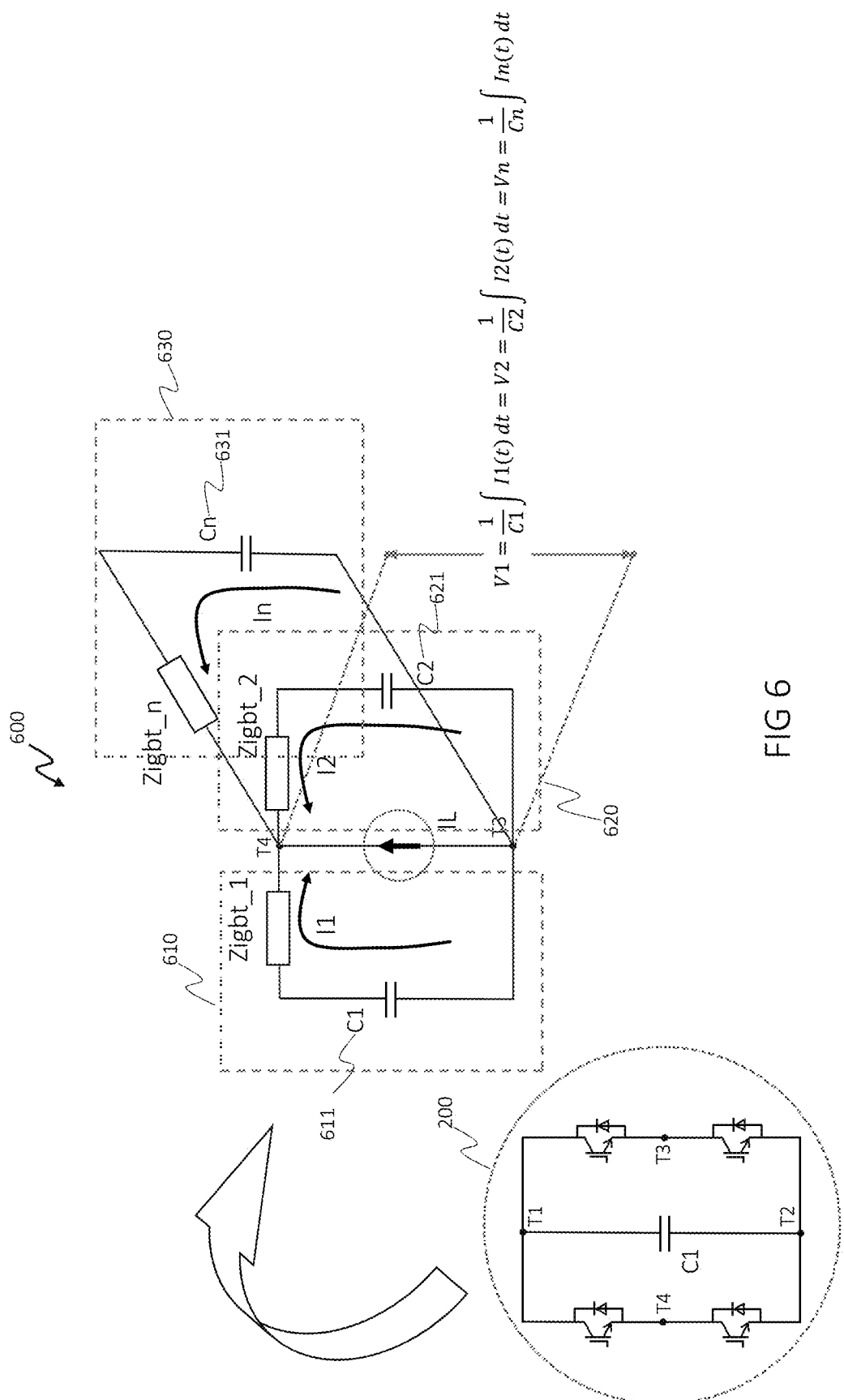
FIG. 6 illustrates an equivalent circuit of an example voltage-source converter comprising two parallel inverter valve units.

FIG. 6 illustrates an equivalent circuit a first inverter valve unit 610 and a second inverter valve unit 620 and an "n-th" inverter valve unit 630 connectedly arranged in parallel. If the capacitors C1 611 and C2 621 and Cn 631 are equal, voltages and currents of the first inverter valve unit and a second inverter valve unit are equalized providing self-balancing. It should be appreciated that, in various embodiments of voltage source converters under real-world conditions, equal capacitance, equal voltages and equal currents should be considered as relatively equal under considerations of component and circuit manufacturing tolerances and further practical considerations.

The following conditions are fulfilled:

$$Z_{C1} \sim Z_{C2} \sim Z_{Cn} \gg Z_{Igbt\_1}, Z_{Igbt\_2}, Z_{Igbt\_n}$$

$$V1 = V2 = Vn = V$$

$$I_1(t) + I_2(t) + I_n(t) = I_L(t) \tag{1}$$

$$V1 = \frac{1}{C1}\int I1(t)dt = V2 = \frac{1}{C2}\int I2(t)dt = Vn = \frac{1}{Cn}\int In(t)dt \tag{2}$$

In the case simplified for two inverter valve units, i.e. n=2:

$$\frac{1}{C1}\int I1(t)dt = \frac{1}{C2}\int [IL(t) - I1(t)]dt$$

$$\frac{C1+C2}{C1}\int I1(t)dt = \int [IL(t)]dt$$

$$IL(t) = \frac{C1+C2}{C1}I1(t)dt$$

If C2~C1

$$I1(t) = \frac{1}{2}IL(t)dt$$

$$I2(t) = \frac{1}{2}IL(t)dt$$

where;
$Z_{C1}$ is the equivalent impedance of C1 611,
$Z_{C2}$ is the equivalent impedance of C2 621,
$Z_{Igbt\_1}$ is the IGBTs, switching element 100, equivalent impedance of the first inverter valve unit 610,
$Z_{Igbt\_2}$ is the IGBTs, switching element 100, equivalent impedance of the second inverter valve unit 620,
I₁(t) is the first AC current of the first inverter valve unit 610,
I₂ (t) is the first AC current of the second inverter valve unit 620,
$I_L$ (t) is the transmission line current,
V1 is the injected AC voltage of the of the first inverter valve unit 610
V2 is the injected AC voltage of the of the second inverter valve unit 620, and
V is the transmission line injected AC voltage.

In some embodiments, the self-balancing circuit increases the transmission line current $I_L$(t) operation of the VSC 600. When all the switching elements are in function the first inverter valve unit 610 produces a first AC current I₁(t) and the second inverter valve unit 620 produces a second AC current I₂ (t) such that the transmission line current I₁ (t)

equals the sum of the parallel connected first AC current $I_1$ (t) and second AC current $I_2$ (t). By way of control of the IGBT switching elements, it is possible to vary the transmission line injected AC voltage (V) in magnitude as well as the phase relationship to the AC system voltage. The low impedance paralleling conductors provide the parallel connection of the first inverter valve unit 610 and the second inverter valve unit 620, such that V1=V2=V. Therein the VSC 600 injects an AC (V) voltage in series with the transmission line. If the injected AC voltage (V) is in phase quadrature with the transmission line current, the VSC supplies or consumes variable reactive power. The self-balancing circuit comprising the paralleling conductor pair produces a first AC current $I_1(t)$ equal to the second AC current $I_2$ (t) such that the VSC 600 currents are balanced.

Figure 7:
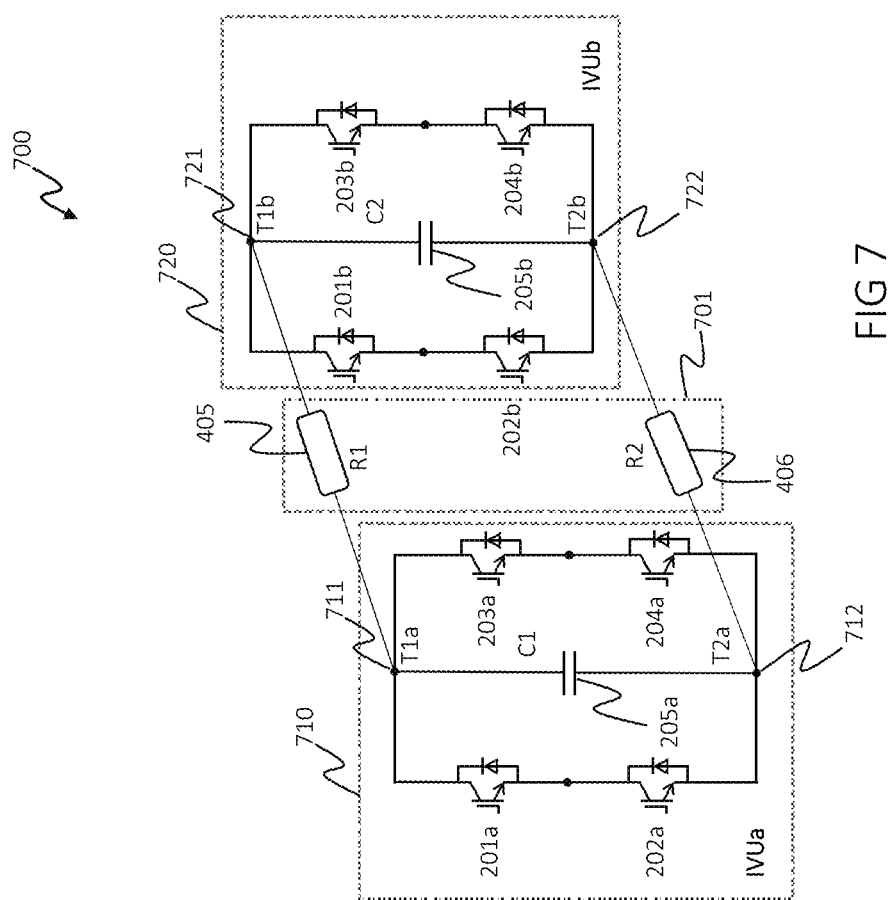
FIG. 7 illustrates a simplified circuit of an example voltage-source converter comprising two parallel inverter valve units.

FIG. 7 illustrates a simplified circuit diagram of an example VSC 700 comprising two inverter valve units. A first inverter valve unit (IVUa) 710 and a second inverter valve unit (IVUb) 720 are connectedly arranged in parallel. The parallel connection of the first inverter valve unit 710 and second inverter valve unit 720 combine a first AC current and a second AC current such that the transmission line current equals the sum of the first AC current and the second AC current. The capacitors 205*a* and 205*b* have equal capacitance. IGBT's 201*a*, 201*b*, 202*a*, 202*b*, 203*a*, 203*b*, 204*a* and 204*b* are same specification components; for example, Mitsubishi Electric CM1000DX(P)-24T.

A dynamic self-balancing circuit arrangement that has a first paralleling conductor pair 701 provides parallel connection of the first inverter valve unit and the second inverter valve unit. In one embodiment, the paralleling conductor pair has two low impedance paralleling conductors 405 and 406, and the impedance of the low impedance paralleling conductor is less than 10 ohms. The first paralleling conductor pair 701 connects the first terminal T1*a* 711 and the second terminal T2*a* 712 of the first inverter valve unit 710 to the respective first terminal T1*b* 721 and the respective second terminal T2*b* 722 of the second inverter valve unit 720.

Figure 8:
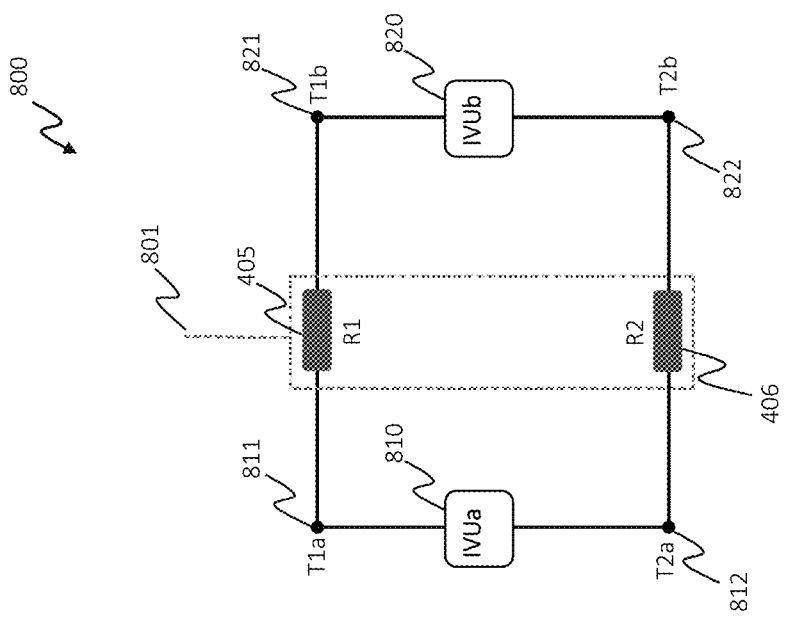
FIG. 8 illustrates an equivalent circuit of the voltage-source converter comprising two inverter valve units.

FIG. 8 illustrates an equivalent circuit of a voltage-source converter that has two inverter valve units. In a first embodiment, voltage-source converter 800 has a first inverter valve unit (IVUa) 810 and a second inverter valve unit (IVUb) 820 connectedly arranged in parallel. A dynamic self-balancing circuit arrangement that has a first paralleling conductor pair 801 provides parallel connection of the first inverter valve unit 810 and the second inverter valve unit 820.

In one embodiment, the first paralleling conductor pair 801 has two low impedance paralleling conductors R1 405 and R2 406, and the impedance of the low impedance paralleling conductor is less than 10 ohms. The first paralleling conductor pair 801 connects the first terminal T1*a* 811 and the second terminal T2*a* 812 of the first inverter valve unit 810 to the respective first terminal T1*b* 821 and the respective second terminal T2*b* 822 of the second inverter valve unit 820.

When all the switching elements are in functional operation, the first inverter valve unit produces a first AC current and the second inverter valve unit produces a second AC current such that the transmission line current equals the sum of the parallel connected first AC current and the second AC current. Therein, the circuit arrangement increases the AC current capacity of the power inverter. If the inverter valve unit capacitors are equal, voltages and currents of the first inverter valve unit 810 and the second inverter valve unit 820 are equalized which in turn lowers the circulating currents within the VSC and instantaneous voltages across each capacitor providing a form of self-regulation or dynamic self-balancing.

Further, the dynamic self-balancing circuit arrangement of a first paralleling conductors pair 801 produces the first AC current of the first inverter valve unit 810 equal to the second AC current of the second inverter valve unit 820 such that the currents in the VSC are balanced. As a result, excessive currents within the VSC and unwanted AC harmonics on the transmission line current and are reduced.

Figure 9:
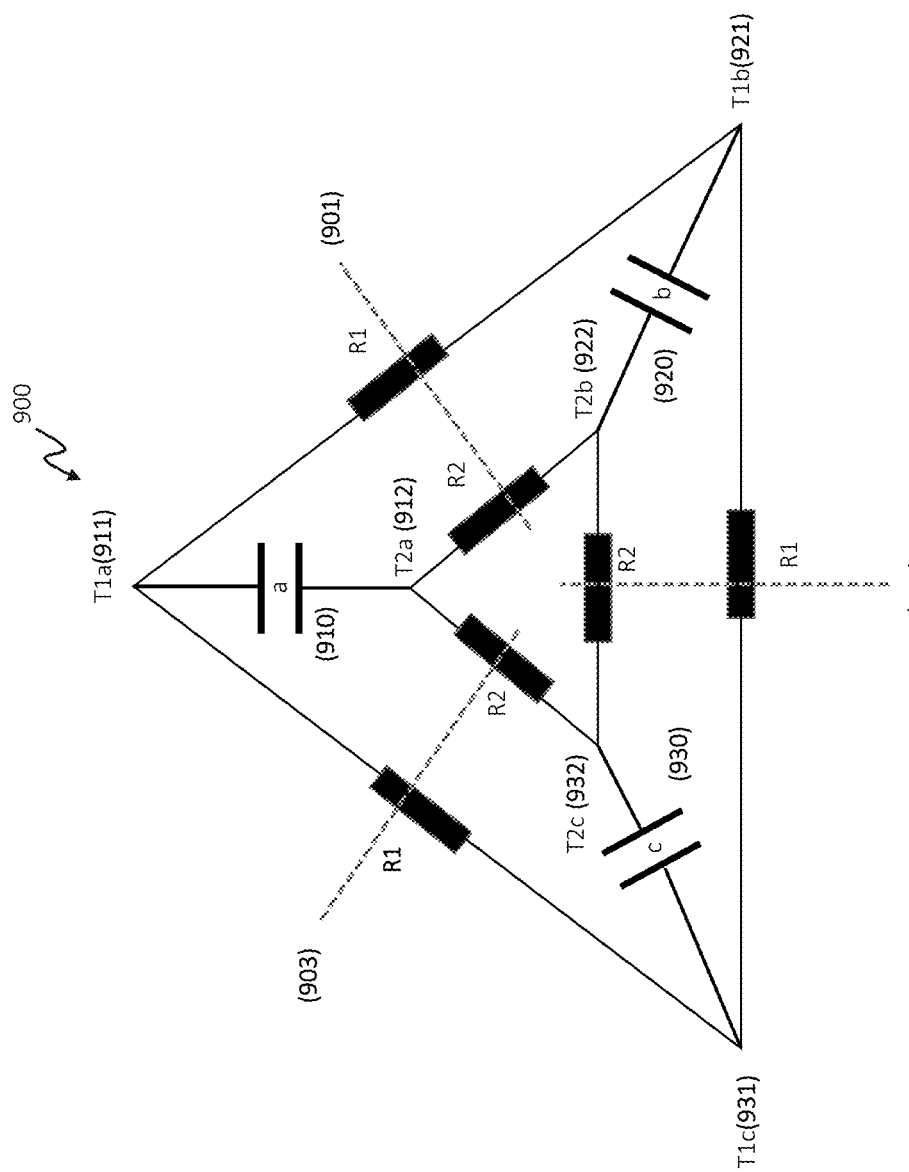
FIG. 9 illustrates an equivalent circuit of the voltage-source converter comprising three inverter valve units.

FIG. 9 illustrates an equivalent circuit of a voltage-source converter that has three inverter valve units. In a second embodiment, voltage-source converter 900 has a first inverter valve unit (IVUa) 910, a second inverter valve unit (IVUb) 920 and a third inverter valve unit (IVUc) 930 connectedly arranged in parallel.

A dynamic self-balancing circuit arrangement that has a first paralleling conductor pair 901 provides parallel connection of the first inverter valve unit 910 and the second inverter valve unit 920. A second paralleling conductor pair 902 provides parallel connection of the second inverter valve unit 920 and the third inverter valve unit 930. A third paralleling conductor pair 903 provides parallel connection of the third inverter valve unit 930 and the first inverter valve unit 910.

In one embodiment, each paralleling conductor pair 901, 902 and 903 has two low impedance paralleling conductors R1 405 and R2 406, and the impedance of the low impedance paralleling conductor is less than 10 ohms. The first paralleling conductor pair 901 connects the first terminal T1*a* 911 and the second terminal T2*a* 912 of the first inverter valve unit 910 to the respective first terminal T1*b* 921 and the respective second terminal T2*b* 922 of the second inverter valve unit 922. The second paralleling conductor pair 902 connects the first terminal T1*b* 921 and the second terminal T2*b* 922 of the second inverter valve unit 920 to the respective first terminal T1*c* 931 and the respective second terminal T2*c* 932 of the third inverter valve unit 930. The third paralleling conductor pair 903 connects the first terminal T1*c* 931 and the second terminal T2*c* 932 of the third inverter valve unit 930 to the respective first terminal T1*a* 911 and the respective second terminal T2*a* 912 of the first inverter valve unit 910.

When all the switching elements are in functional operation, the first inverter valve unit 910 produces a first AC current, the second inverter valve unit 920 produces a second AC current and the third inverter valve unit 930 produces a third AC current such that the transmission line current equals the sum of the parallel connected first AC current, second AC current and third AC current. Therein, the circuit arrangement increases the AC current capacity of the power inverter. If the inverter valve unit capacitors are equal, voltages and currents of the first inverter valve unit 910, the second inverter valve unit 920 and the third inverter valve unit 930 are equalized which in turn lowers the circulating currents within the VSC and instantaneous voltages across each capacitor providing a form of self-regulation or dynamic self-balancing.

Further, the dynamic self-balancing circuit arrangement that has a first paralleling conductors pair 901, a second paralleling conductors pair 902 and third paralleling conductors pair 903 produces the first AC current of the first inverter valve unit 910 equal to the second AC current of the second inverter valve unit 920 equal to the third AC current of the third inverter valve unit 930 such that the currents in the VSC are balanced. As a result, excessive currents within the VSC and unwanted AC harmonics on the transmission line current and are reduced.

Figure 10:
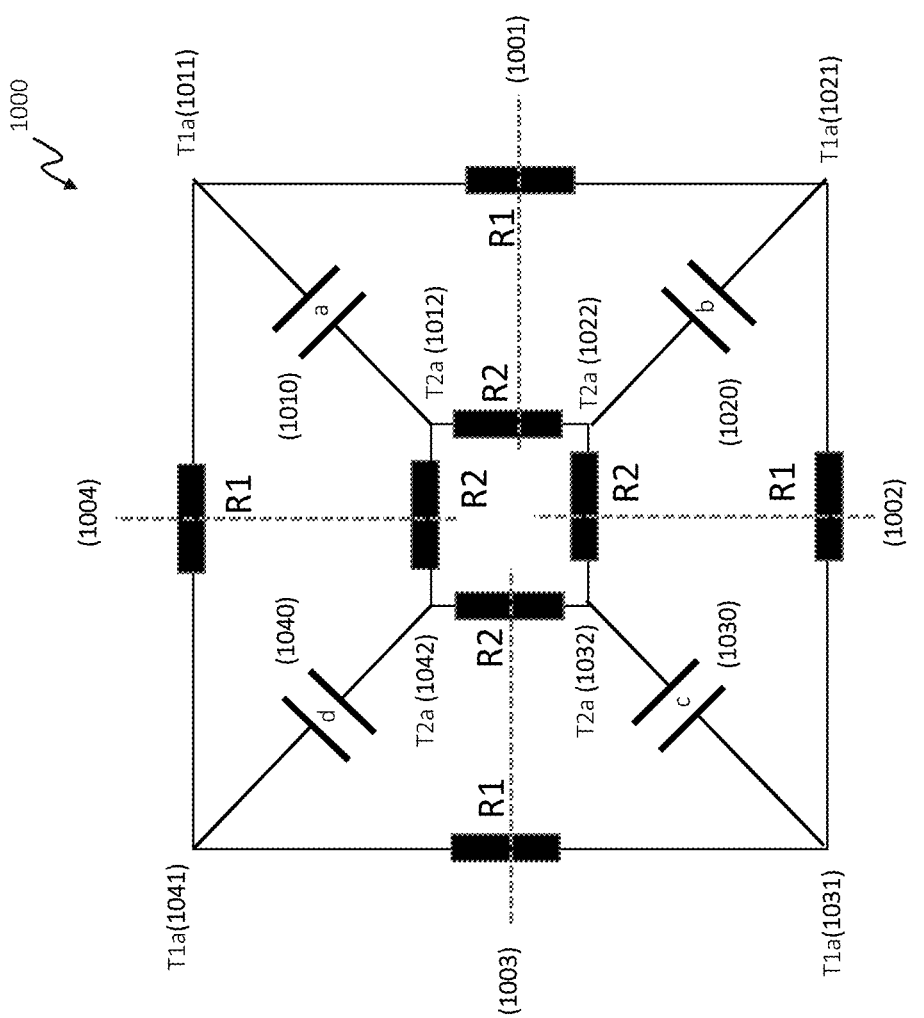
FIG. 10 illustrates an equivalent circuit of the voltage-source converter comprising four inverter valve units.

FIG. 10 illustrates an equivalent circuit of a voltage-source converter that has four inverter valve units. In a third embodiment, voltage-source converter 1000 has a first inverter valve unit (IVUa) 1010, a second inverter valve unit (IVUb) 1020, a third inverter valve unit (IVUc) 1030 and a fourth inverter valve unit (IVUd) 1040 connectedly arranged in parallel.

A dynamic self-balancing circuit arrangement that has a first paralleling conductor pair 1001 provides parallel connection of the first inverter valve unit 1010 and the second inverter valve unit 1020. A second paralleling conductor pair 1002 provides parallel connection of the second inverter valve unit 1020 and the third inverter valve unit 1030. A third paralleling conductor pair 1003 provides parallel connection of the third inverter valve unit 1030 and the fourth inverter valve unit 1040. A fourth paralleling conductor pair 1004 provides parallel connection of the fourth inverter valve unit 1040 and the first inverter valve unit 1010.

In one embodiment, each paralleling conductor pair 1001, 1002, 1003 and 1004 has two low impedance paralleling conductors R1 405 and R2 406, and the impedance of the low impedance paralleling conductor is less than 10 ohms. The first paralleling conductor pair 1001 connects the first terminal T1a 1011 and the second terminal T2a 1021 of the first inverter valve unit 1010 to the respective first terminal T1b 1021 and the respective second terminal T2b 1022 of the second inverter valve unit 1020. The second paralleling conductor pair 1002 connects the first terminal T1b 1021 and the second terminal T2b 1022 of the second inverter valve unit 1020 to the respective first terminal T1c 1031 and the respective second terminal T2c 1032 of the third inverter valve unit 1030. The third paralleling conductor pair 1003 connects the first terminal T1c 1031 and the second terminal T2c 1032 of the third inverter valve unit 1030 to the respective first terminal T1d 1041 and the respective second terminal T2d 1042 of the fourth inverter valve unit 1040. The fourth paralleling conductor pair 1004 connects the first terminal T1d 1041 and the second terminal T2d 1042 of the fourth inverter valve unit 1040 to the respective first terminal T1a 1011 and the respective second terminal T2a 1012 of the first inverter valve unit 1010.

When all the switching elements are in functional operation, the first inverter valve unit 1010 produces a first AC current, the second inverter valve unit 1020 produces a second AC current, the third inverter valve unit 1030 produces a third AC current and the fourth inverter valve unit 1040 produces a fourth AC current such that the transmission line current equals the sum of the parallel connected first AC current, the second AC current, the third AC current and fourth AC current. Therein, the circuit arrangement increases the AC current capacity of the power inverter. If the inverter valve unit capacitors are equal, voltages and currents of the first inverter valve unit 1010, the second inverter valve unit 1020, the third inverter valve unit 1030 and the fourth inverter valve unit 1040 are equalized which in turn lowers the circulating currents within the VSC and instantaneous voltages across each capacitor providing a form of self-regulation or dynamic self-balancing.

Further, the dynamic self-balancing circuit arrangement that has a first paralleling conductors pair 1001, a second paralleling conductors pair 1002, third paralleling conductors pair 1003 and fourth paralleling conductors pair 1004 produces the first AC current of the first inverter valve unit 1010 equal to the second AC current of the second inverter valve unit 1020 equal to the third AC current of the third inverter valve unit 1030 equal to the fourth AC current of the fourth inverter valve unit 1040 such that the currents in the VSC are balanced. As a result, excessive currents within the VSC and unwanted AC harmonics on the transmission line current and are reduced.

Figure 11:
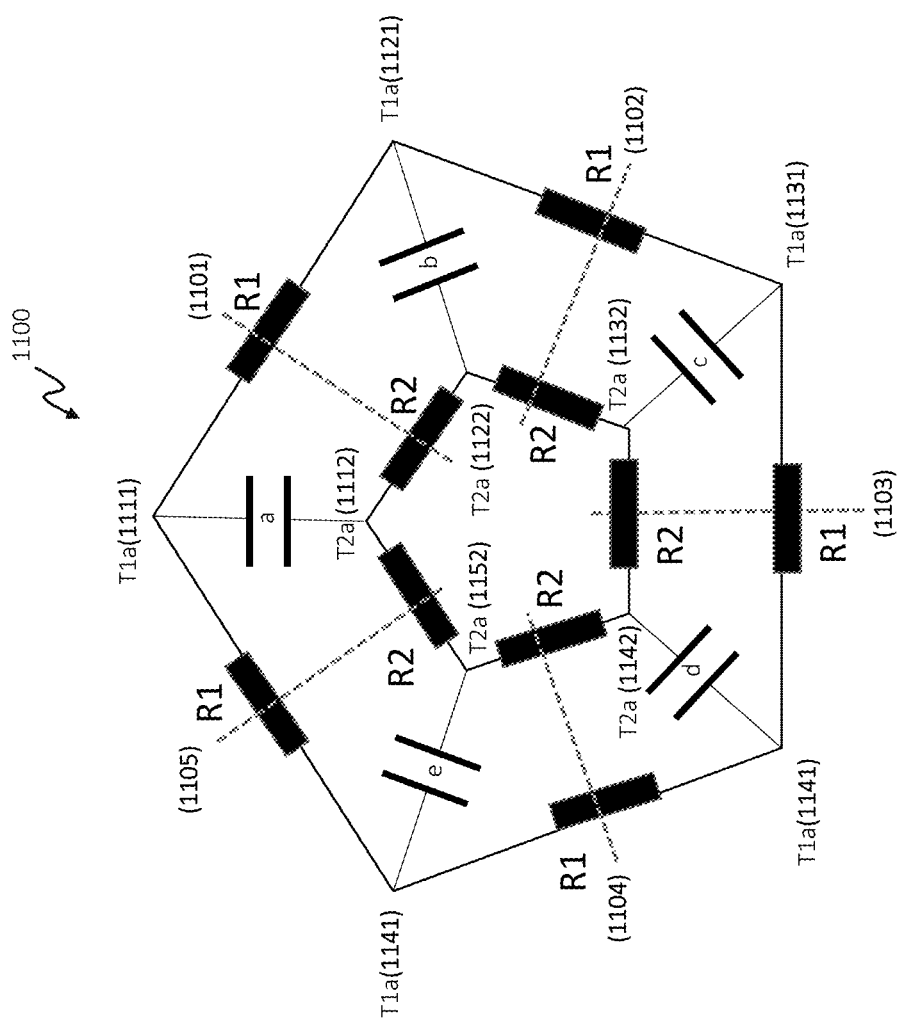
FIG. 11 illustrates an equivalent circuit of the voltage-source converter comprising five inverter valve units.

FIG. 11 illustrates an equivalent circuit of a voltage-source converter that has five inverter valve units. In a fourth embodiment, voltage-source converter 1100 has a first inverter valve unit (IVUa) 1110, a second inverter valve unit (IVUb) 1120, a third inverter valve unit (IVUc) 1130, a fourth inverter valve unit (IVUd) 1140 and a fifth inverter valve unit (IVUe) 1150 connectedly arranged in parallel.

A dynamic self-balancing circuit arrangement of a first paralleling conductor pair 1101 provides parallel connection of the first inverter valve unit 1110 and the second inverter valve unit 1120. A second paralleling conductor pair 1102 provides parallel connection of the second inverter valve unit 1120 and the third inverter valve unit 1130. A third paralleling conductor pair 1103 provides parallel connection of the third inverter valve unit 1130 and the fourth inverter valve unit 1140. A fourth paralleling conductor pair 1104 provides parallel connection of the fourth inverter valve unit 1140 and the fifth inverter valve unit 1150. A fifth paralleling conductor pair 1105 provides parallel connection of the fifth inverter valve unit 1050 and the first inverter valve unit 1110.

In one embodiment, each paralleling conductor pair 1101, 1102, 1103, 1104 and 1105 has two low impedance paralleling conductors R1 405 and R2 406, and the impedance of the low impedance paralleling conductor is less than 10 ohms. The first paralleling conductor pair 1101 connects the first terminal T1a 1111 and the second terminal T2a 1112 of the first inverter valve unit 1110 to the respective first terminal T1b 1121 and the respective second terminal T2b 1122 of the second inverter valve unit 1120. The second paralleling conductor pair 1102 connects the first terminal T1b 1121 and the second terminal T2b 1122 of the second inverter valve unit 1120 to the respective first terminal T1c 1131 and the respective second terminal T2c 1132 of the third inverter valve unit 1130. The third paralleling conductor pair 1103 connects the first terminal T1c 1131 and the second terminal T2c 1132 of the third inverter valve unit 1130 to the respective first terminal T1d 1141 and the respective second terminal T2d 1142 of the fourth inverter valve unit 1140. The fourth paralleling conductor pair 1104 connects the first terminal T1d 1141 and the second terminal T2d 1142 of the fourth inverter valve unit 1140 to the respective first terminal T1e 1151 and the respective second terminal T2e 1152 of the fifth inverter valve unit 1150. The fifth paralleling conductor pair 1105 connects the first terminal T1e 1151 and the second terminal T2e 1152 of the fifth inverter valve unit 1150 to the respective first terminal T1a 1111 and the respective second terminal T2a 1112 of the first inverter valve unit 1110.

When all the switching elements are in functional operation, the first inverter valve unit 1110 produces a first AC current, the second inverter valve unit 1120 produces a second AC current, the third inverter valve unit 1130 produces a third AC current, the fourth inverter valve unit 1140 and the fifth inverter valve unit 1150 produces a fifth AC current such that the transmission line current equals the sum of the parallel connected first AC current, the second AC current, the third AC current, the fourth AC current and fifth AC current. Therein, the circuit arrangement increases the AC current capacity of the power inverter. If the inverter valve unit capacitors are equal, voltages and currents of the first inverter valve unit 1110, the second inverter valve unit 1120, the third inverter valve unit 1130, the fourth inverter valve unit 1140 and the fifth inverter valve unit 1150 are equalized which in turn lowers the circulating currents within the VSC and instantaneous voltages across each capacitor providing a form of self-regulation or dynamic self-balancing.

Further, the dynamic self-balancing circuit arrangement that has a first paralleling conductors pair 1101, a second paralleling conductors pair 1102, third paralleling conductors pair 1103, fourth paralleling conductors pair 1104 and fifth paralleling conductors pair 1105 produces the first AC current of the first inverter valve unit 1110 equal to the second AC current of the second inverter valve unit 1120 equal to the third AC current of the third inverter valve unit 1130 equal to the fourth AC current of the fourth inverter valve unit 1140 equal to the fifth AC current of the fifth inverter valve unit 1150 such that the currents in the VSC are balanced. As a result, excessive currents within the VSC and unwanted AC harmonics on the transmission line current and are reduced.

Figure 12:
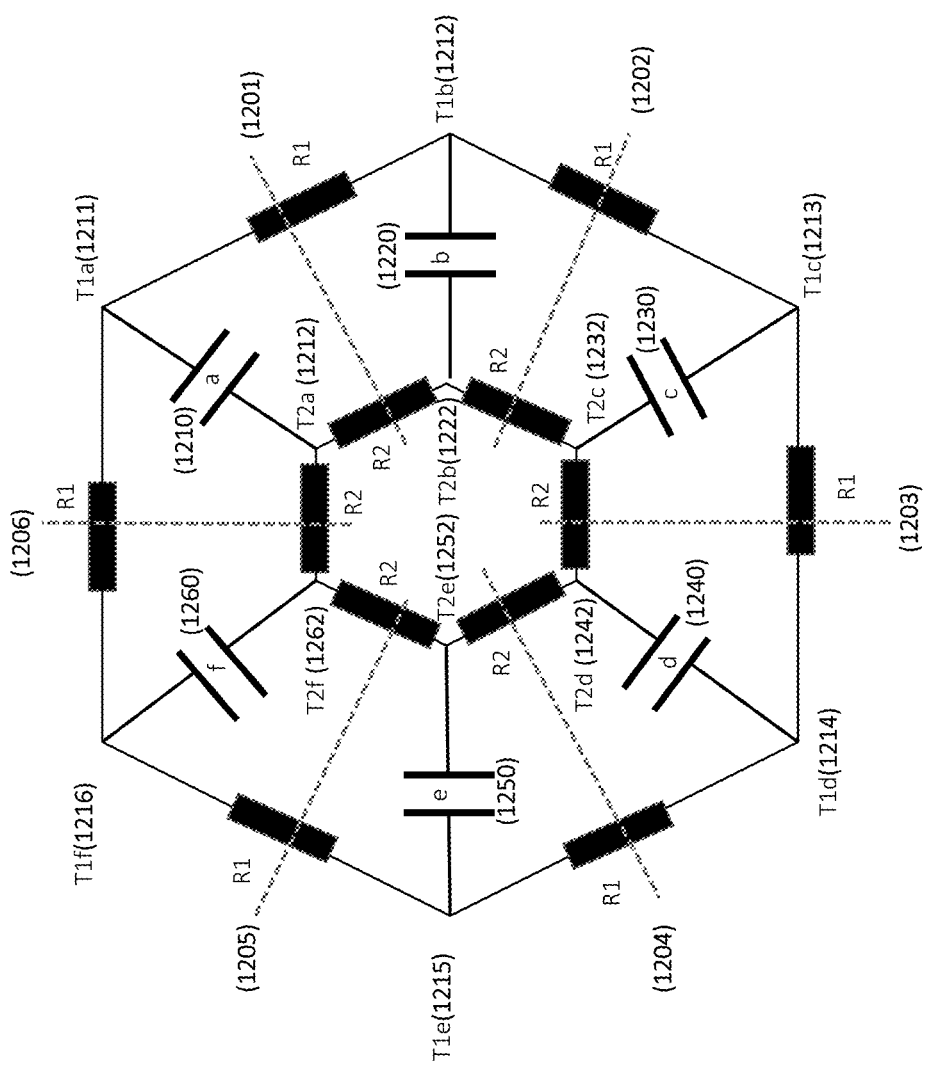
FIG. 12 illustrates an equivalent circuit of the voltage-source converter comprising six inverter valve units.

FIG. 12 illustrates an equivalent circuit of a voltage-source converter that has six inverter valve units. In a fifth embodiment, voltage-source converter 1200 has a first inverter valve unit (IVUa) 1210, a second inverter valve unit (IVUb) 1220, a third inverter valve unit (IVUc) 1230, a fourth inverter valve unit (IVUd) 1240, a fifth inverter valve unit (IVUe) 1150 and a sixth inverter valve unit (IVUf) 1260 connectedly arranged in parallel.

A dynamic self-balancing circuit arrangement of a first paralleling conductor pair 1201 provides parallel connection of the first inverter valve unit 1210 and the second inverter valve unit 1220. A second paralleling conductor pair 1202 provides parallel connection of the second inverter valve unit 1220 and the third inverter valve unit 1230. A third paralleling conductor pair 1203 provides parallel connection of the third inverter valve unit 1230 and the fourth inverter valve unit 1240. A fourth paralleling conductor pair 1204 provides parallel connection of the fourth inverter valve unit 1240 and the fifth inverter valve unit 1250. A fifth paralleling conductor pair 1205 provides parallel connection of the fifth inverter valve unit 1250 and the sixth inverter valve unit 1260. A sixth paralleling conductor pair 1206 provides parallel connection of the sixth inverter valve unit 1260 and the first inverter valve unit 1210.

In one embodiment, each paralleling conductor pair 1201, 1202, 1203, 1204, 1205 and 1206 has two low impedance paralleling conductors R1 405 and R2 406 (see FIG. 8), and the impedance of each low impedance paralleling conductor is less than 10 ohms. The first paralleling conductor pair 1201 connects the first terminal T1$a$ 1211 and the second terminal T2$a$ 1212 of the first inverter valve unit 1210 to the respective first terminal T1$b$ 1221 and the respective second terminal T2$b$ 1222 of the second inverter valve unit 1220. The second paralleling conductor pair 1202 connects the first terminal T1$b$ 1221 and the second terminal T2$b$ 1232 of the second inverter valve unit 1220 to the respective first terminal T1$c$ 1231 and the respective second terminal T2$c$ 1232 of the third inverter valve unit 1230. The third paralleling conductor pair 1203 connects the first terminal T1$c$ 1231 and the second terminal T2$c$ 1232 of the third inverter valve unit 1230 to the respective first terminal T1$d$ 1241 and the respective second terminal T2$d$ 1242 of the fourth inverter valve unit 1240. The fourth paralleling conductor pair 1204 connects the first terminal T1$d$ 1241 and the second terminal T2$d$ 1242 of the fourth inverter valve unit 1240 to the respective first terminal T1$e$ 1251 and the respective second terminal T2$e$ 1252 of the fifth inverter valve unit 1250. The fifth paralleling conductor pair 1205 connects the first terminal T1$e$ 1251 and the second terminal T2$e$ 1262 of the fifth inverter valve unit 1250 to the respective first terminal T1$f$ 1261 and the respective second terminal T2$f$ 1261 of the sixth inverter valve unit 1260. The sixth paralleling conductor pair 1206 connects the first terminal T1$f$ 1261 and the second terminal T2$f$ 1262 of the sixth inverter valve unit 1260 to the respective first terminal T1$a$ 1211 and the respective second terminal T2$a$ 1212 of the first inverter valve unit 1210.

When all the switching elements are in functional operation, the first inverter valve unit 1210 produces a first AC current, the second inverter valve unit 1220 produces a second AC current, the third inverter valve unit 1230 produces a third AC current, the fourth inverter valve unit 1240, the fifth inverter valve unit 1250 produces a fifth AC current and the sixth inverter valve unit 1260 produces a sixth AC current such that the transmission line current equals the sum of the parallel connected first AC current, the second AC current, the third AC current, the fourth AC current, the fifth AC current and sixth AC current. Therein, the circuit arrangement increases the AC current capacity of the power inverter. If the inverter valve unit capacitors are equal, voltages and currents of the first inverter valve unit 1210, the second inverter valve unit 1220, the third inverter valve unit 1230, the fourth inverter valve unit 1240, the fifth inverter valve unit 1250 and the sixth inverter valve unit 1260 are equalized which in turn lowers the circulating currents within the VSC and instantaneous voltages across each capacitor providing a form of self-regulation or dynamic self-balancing.

Further, the dynamic self-balancing circuit arrangement of a first paralleling conductors pair 1201, a second paralleling conductors pair 1202, a third paralleling conductors pair 1203, a fourth paralleling conductors pair 1204, a fifth paralleling conductors pair 1205 and a sixth paralleling conductors pair 1206 produces the first AC current of the first inverter valve unit 1210 equal to the second AC current of the second inverter valve unit 1220 equal to the third AC current of the third inverter valve unit 1230 equal to the fourth AC current of the fourth inverter valve unit 1240 equal to the fifth AC current of the fifth inverter valve unit 1250 equal to the sixth AC current of the sixth inverter valve unit 1260 such that the currents in the VSC are balanced. As a result, excessive currents within the VSC and unwanted AC harmonics on the transmission line current and are reduced.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A voltage source converter, comprising:
two or more inverter valve units operable to inject reactive power into a power transmission line, each of the two or more inverter valve units comprising a full H bridge of switching devices, each full H bridge having a third terminal between third and fourth switching devices of the full H bridge, a fourth terminal between first and second switching devices of the full H bridge, and a capacitor having first and second terminals, wherein a first inverter valve unit of the two or more inverter valve units and a second inverter valve unit of the two or more inverter valve units are connected in parallel between a first transmission line terminal and a second transmission line terminal, with the third terminal of the full H bridge of the first inverter valve unit and the third terminal of the full H bridge of the second inverter valve unit connected to the first transmission line terminal, and with the fourth terminal of the full H bridge of the first inverter valve unit coupled to the second transmission line terminal through a first inductor and the fourth terminal of the full H bridge of the second inverter valve unit coupled to the second transmission line terminal through a second inductor; and one or more paralleling conductor pairs comprising a first paralleling conductor and a second paralleling conductor connecting the first inverter valve unit of the two or more inverter valve units and the second inverter valve unit of the two or more inverter valve units in parallel, with the first terminal of the capacitor of the full H bridge of the first inverter valve unit connected to the first terminal of the capacitor of the full H bridge of the second inverter valve unit through the first paralleling conductor, and the second terminal of the capacitor of the full H bridge of the first inverter valve unit connected to the second terminal of the capacitor of the full H bridge of the second inverter valve unit through the second parallelling conductor, in a self-balancing circuit arrangement, wherein the one or more paralleling conductor pairs comprises a paralleling conductor pair to connect two of the two or more inverter valve units in parallel at the first and second terminals of the capacitors, or three or more paralleling conductor pairs to connect three or more of the two or more inverter valve units in parallel at the first and second terminals of the capacitors;

wherein the voltage source converter is series coupled to the power transmission line through the first transmission line terminal and the second transmission line terminal.

2. The voltage source converter of claim 1, wherein the self-balancing circuit arrangement balances current flows of the two or more inverter valve units.

3. The voltage source converter of claim 1, wherein the self-balancing circuit arrangement comprises each inverter valve unit of the two or more inverter valve units having equal capacitance of the capacitor and equal AC (alternating current) current of the inverter valve unit such that currents of the two or more inverter valve units are balanced.

4. The voltage source converter of claim 1, wherein each switching device of the first, second, third and fourth switching devices of the full H bridge of each of the two or more inverter valve units has a freewheeling diode in parallel with the switching device.

5. The voltage source converter of claim 1, wherein the full H bridge of switching devices of each of the two or more inverter valve units comprises same specification components.

6. The voltage source converter of claim 1, wherein each switching device of the first, second, third and fourth switching devices of the full H bridge of each of the two or more inverter valve units comprises an insulated gate bipolar transistor (IGBT).

7. The voltage source converter of claim 1, wherein each paralleling conductor of each of the one or more paralleling conductor pairs comprises a conductor having impedance less than 10 ohms.

8. The voltage source converter of claim 1, wherein the two or more inverter valve units comprises three, four, five or six inverter valve units.

9. The voltage source converter of claim 1, wherein:
the one or more paralleling conducting pairs provide terminals for coupling the two or more inverter valve units to the power transmission line; and
the voltage source converter further comprises a controller to drive the first, second, third and fourth switching devices of the full H bridge of each of the two or more inverter valve units.

10. A voltage source converter, comprising:
a first inverter valve unit, comprising a first full H bridge of switching devices, the first full H bridge having a third terminal between third and fourth switching devices of the first full H bridge, a fourth terminal between first and second switching devices of the first full H bridge, and a first capacitor having first and second terminals;
a second inverter valve unit, comprising a second full H bridge of switching devices, the second full H bridge having a third terminal between third and fourth switching devices of the second full H bridge, a fourth terminal between first and second switching devices of the second full H bridge, and a second capacitor having first and second terminals;
the first inverter valve unit and the second inverter valve unit are connected in parallel between a first transmission line terminal and a second transmission line terminal, with the third terminal of the first full H bridge and the third terminal of the second full H bridge connected to the first transmission line terminal, with the fourth terminal of the first full H bridge coupled to the second transmission line terminal through a first inductor and the fourth terminal of the second full H bridge coupled to the second transmission line terminal through a second inductor, and operable to inject reactive power into a transmission line; and
a first paralleling conductor and a second paralleling conductor, connecting the first inverter valve unit and the second inverter valve unit in parallel, with the first terminal of the first capacitor connected to the first terminal of the second capacitor through the first paralleling conductor, and the second terminal of the first capacitor connected to the second terminal of the second capacitor through the second parallelling conductor, in a self-balancing circuit arrangement having terminals for coupling to the transmission line;
wherein the voltage source converter is series coupled to the transmission line through the first transmission line terminal and the second transmission line terminal.

11. The voltage source converter of claim 10, wherein the self-balancing circuit arrangement balances current flows of the first inverter valve unit and the second inverter valve unit.

12. The voltage source converter of claim 10, wherein the self-balancing circuit arrangement comprises equal capacitance of the first capacitor and the second capacitor and equal AC (alternating current) currents of the first inverter valve unit and the second inverter valve unit.

13. The voltage source converter of claim 10, wherein each switching device of the first, second, third and fourth switching devices of the first and second full H bridges has a freewheeling diode in parallel with the switching device.

14. The voltage source converter of claim 10, wherein the first full H bridge and the second full H bridge have same specification switching devices.

15. The voltage source converter of claim 10, wherein each switching device of the first, second, third and fourth switching devices of the first and second full H bridges comprises an insulated gate bipolar transistor (IGBT).

16. The voltage source converter of claim 10, wherein each of the first paralleling conductor and the second paralleling conductor has an impedance less than 10 ohms.

17. The voltage source converter of claim 10, further comprising one or more further inverter valve units, one or more further first paralleling conductors, and one or more further second paralleling conductors;
   wherein the first and second inverter valve units and the one or more further inverter valve units are connected in parallel.

18. The voltage source converter of claim 10, further comprising:
   a controller to drive at least the first, second, third and fourth switching devices of the first full H bridge and the first, second, third and fourth switching devices of the second full H bridge.

19. A method of operation of a voltage source converter, comprising:
   controlling switching devices of a full H bridge having a capacitor, of each of two or more inverter valve units operable to inject reactive power into a power transmission line, by corresponding one or more paralleling conductor pairs comprising a first paralleling conductor and a second paralleling conductor that connect a first inverter valve unit of the two or more inverter valve units and a second inverter valve unit of the two or more inverter valve units in parallel, with a first terminal of the capacitor of the full H bridge of the first inverter valve unit connected to a first terminal of the capacitor of the full H bridge of the second inverter valve unit through the first paralleling conductor, and a second terminal of the capacitor of the full H bridge of the first inverter valve unit connected to a second terminal of the capacitor of the full H bridge of the second inverter valve unit through the second parallelling conductor, in a self-balancing circuit arrangement, wherein the one or more paralleling conductor pairs comprises a paralleling conductor pair to connect two of the two or more inverter valve units in parallel at the first and second terminals of the capacitors of the two inverter valve units, or three or more paralleling conductor pairs to connect three or more of the two or more inverter valve units in parallel at the first and second terminals of the capacitors of the three or more inverter valve units; and producing balanced AC (alternating current) currents in each of the two or more inverter valve units as a result of the self-balancing circuit arrangement and the controlling of the switching devices of the full H bridges of the two or more inverter valve units;

wherein:

each full H bridge of the two or more inverter valve units further includes a third terminal between third and fourth switching devices of the full H bridge and a fourth terminal between first and second switching devices of the full H bridge;

the first inverter valve unit of the two or more inverter valve units and the second inverter valve unit of the two or more inverter valve units are connected in parallel between a first transmission line terminal and a second transmission line terminal, with the third terminal of the full H bridge of the first inverter valve unit and the third terminal of the full H bridge of the second inverter valve unit connected to the first transmission line terminal, and with the fourth terminal of the full H bridge of the first inverter valve unit coupled to the second transmission line terminal through a first inductor and the fourth terminal of the full H bridge of the second inverter valve unit coupled to the second transmission line terminal through a second inductor;

the voltage source converter is series coupled to the power transmission line through the first transmission line terminal and the second transmission line terminal.

20. The method of claim 19, further comprising:
coupling the two or more inverter valve units to the power transmission line, through the first transmission line terminal and the second transmission line terminal; and
combining the balanced AC currents, through the first transmission line terminal and the second transmission line terminal, to flow between the first transmission line terminal, the second transmission line terminal, and the power transmission line.

* * * * *